(12) United States Patent
Kokeguchi et al.

(10) Patent No.: US 7,479,310 B2
(45) Date of Patent: Jan. 20, 2009

(54) DISPLAYING MEDIUM

(75) Inventors: Noriyuki Kokeguchi, Kokubunji (JP); Satoru Ikesu, Fuchu (JP)

(73) Assignee: Konica Minolta Holdings, Inc. (JP)

( * ) Notice: Subject to any disclaimer, the term of this patent is extended or adjusted under 35 U.S.C. 154(b) by 219 days.

(21) Appl. No.: 11/188,605

(22) Filed: Jul. 25, 2005

(65) Prior Publication Data

US 2006/0027783 A1 Feb. 9, 2006

(30) Foreign Application Priority Data

Aug. 5, 2004 (JP) ............................. 2004-229164

(51) Int. Cl.
*C09K 19/54* (2006.01)
*C09K 19/38* (2006.01)

(52) U.S. Cl. ........................ 428/1.3; 428/1.5; 428/1.55; 252/299.01; 252/299.5

(58) Field of Classification Search ................. 428/1.1, 428/1.3, 1.5, 1.6, 411.1, 1.55; 252/299.01, 252/299.5
See application file for complete search history.

(56) References Cited

U.S. PATENT DOCUMENTS

| | | | | |
|---|---|---|---|---|
| 3,578,844 A | * | 5/1971 | Churchill et al. ............. 349/21 |
| 5,738,804 A | | 4/1998 | Cao et al. |
| 5,784,136 A | | 7/1998 | Ando et al. |
| 6,143,487 A | * | 11/2000 | Philip et al. .................. 430/619 |
| 6,368,759 B1 | * | 4/2002 | Bourdelais et al. ............ 430/15 |
| 6,618,102 B2 | * | 9/2003 | Harada et al. ................. 349/78 |
| 6,704,073 B2 | * | 3/2004 | Stephenson et al. ........... 349/86 |
| 7,229,663 B2 | * | 6/2007 | Stephenson et al. .......... 427/162 |
| 2001/0040542 A1 | * | 11/2001 | Harada et al. ................. 345/87 |
| 2002/0009656 A1 | | 1/2002 | Helber et al. |
| 2005/0013976 A1 | * | 1/2005 | Stephenson et al. ......... 428/209 |

FOREIGN PATENT DOCUMENTS

| | | |
|---|---|---|
| CN | 1338656 A | 3/2002 |
| EP | 0 404 639 A2 | 12/1990 |
| EP | 1 347 329 A1 | 9/2003 |
| JP | 63050819 | 3/1988 |
| JP | 1167825 | 7/1989 |
| JP | 7-287214 | 10/1995 |
| JP | 9-218421 | 8/1997 |
| JP | 2000-98326 | 4/2000 |
| JP | 2003-302625 | 10/2003 |

OTHER PUBLICATIONS

European Search Report for Application No. GB0515188.1 mailed Dec. 8, 2005.

* cited by examiner

*Primary Examiner*—Shean C Wu
(74) *Attorney, Agent, or Firm*—Cantor Colburn LLP

(57) ABSTRACT

A display medium which has a memorizing ability and is superior in the stability under a severe condition or to folding is provided by a displaying medium comprising a substrate and a constituting layer provided on the substrate, in which the constituting layer contains a binder and a liquid crystal composition dispersed in the binder, and the binder contains a hydrophilic polymer hardened by a hardening treatment.

12 Claims, 6 Drawing Sheets

DISPLAYING MEDIUM

RELATED APPLICATION

This application is based on patent application No. 2004-229164 in Japan, the entire content of which is hereby incorporated by reference.

BACKGROUND

1. Field of the Invention

This invention relates to a displaying medium containing a binder and a liquid crystal composition dispersed in the binder.

2. Described of the Related Art

Recently, chances for reading electronic information easily obtained instead of documents or images printed on paper are increasing accompanied with rising of working speed of personal computer, spreading of the infrastructure of net work and growing and coat lowering of data storage means.

For such the means for reading the electronic information, light emission type displays such as a usual liquid crystal display, a CRT and a newly introduced organic EL display are mainly employed. However, it is necessary to watch the displaying means for relatively long time particularly when the electronic information is document information. Therefore, such the means cannot be considered as means suitable for human. It is general known as the shortcomings of the light emission type display that fatigue of eyes is caused by flicker, the displaying means is inconvenient for conveying, the posture of the observer is limited for focusing on the still image and the consumption of electric power is increased for reading for a long duration.

A reflection type display utilizing external light which consumes no electric power for holding the image (memory type) is known as the displaying means for compensation such the shortcomings. Among the reflection type displays, a system in which a liquid crystal composition is dispersed in a binder in a form of oil droplet, so-called as a polymer dispersion type liquid crystal or a scattering liquid crystal, is disclosed in Tokkai 2003-302625, Tokkai Hei 7-287214 and 9-218421 and Tokkai 2000-98326.

As a result of detailed investigation by the inventors on the techniques disclosed in the above patent documents, some problems are found, that the variation in the displaying properties probably caused by shortage of the mechanical strength occurs when the displaying means was stored for long period under a severe condition such as high temperature or high humidity or subjected to a folding test, and the variation probably caused by dissolving of the component for hardening into the liquid crystal composition when a non-aqueous type UV hardening resin or a thermoplastic is employed for raising the mechanical strength, even though the image can be displayed by utilizing the light scattering state and the light penetration state of the liquid crystal. Moreover, the problems relating the storage ability under the sever conditions and the resistivity against folding, and the constitution relating to the invention are not described and suggested in the above documents at all.

SUMMARY OF THE INVENTION

The invention is attained on the above background, and an object of the invention is to provide a displaying medium having the memorizing ability and excellent in the storing ability and stability of the displaying properties under the sever conditions or folding stress. The above object of the invention can be attained by a displaying medium containing a substrate, a binder and a liquid crystal composition dispersed in the binder and at least one kind of the binder is a hardened hydrophilic polymer. The invention itself, together with further objects and attendant advantages, will best be understood by reference to the following detailed description taken in conjunction with the accompanying drawings.

BRIEF DESCRIPTION OF THE DRAWINGS

In the following description, like parts and designated by like reference numbers throughout the several drawings.

DESCRIPTION OF THE PREFERRED EMBODIMENT

Figure 1:
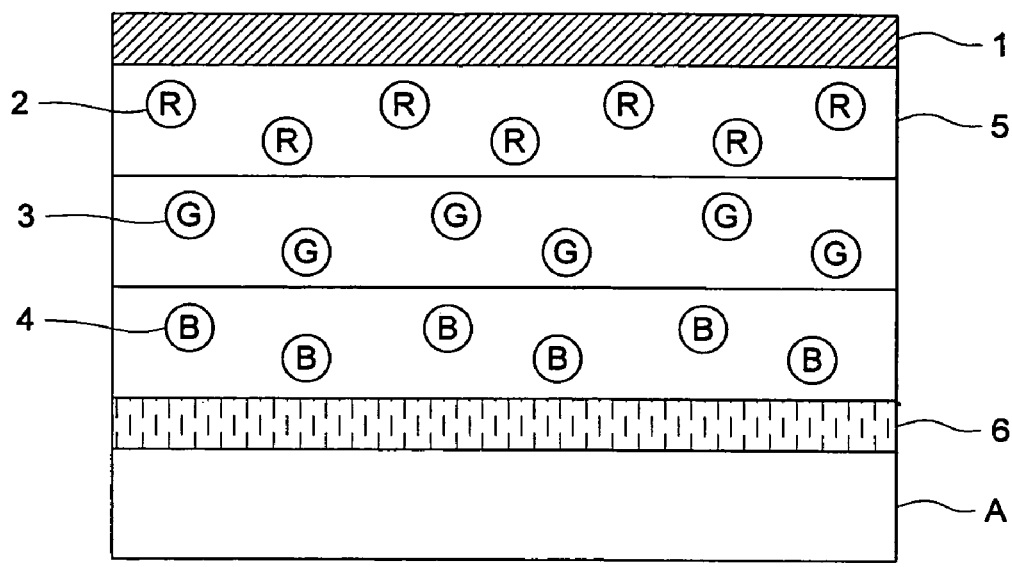
FIG. 1 shows a cross section of an example of the constitution of a color image displaying medium having plural constituting layers containing dispersion of a liquid crystal compound.
Figure 1:
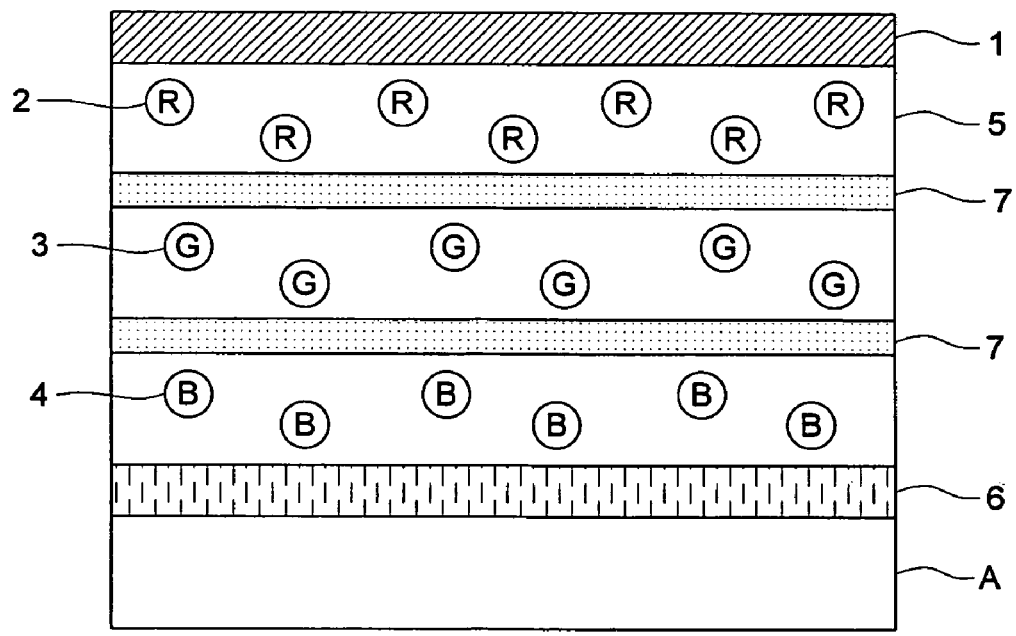

The best embodiment of the invention is described in detail below.

As a result of the investigation on the above problems by the inventors, it is found that the displaying medium having the memorizing ability and excellent in the storing ability and stability of the displaying properties under the sever conditions or folding stress can be realized by a displaying medium containing a substrate, a binder and a liquid crystal composition dispersed in the binder and at least one kind of the binder is a hardened hydrophilic polymer. The hydrophilic polymer is preferably 1) gelatin or a derivative thereof, or 2) poly(vinyl alcohol) or a derivative thereof.

In the invention, it is found that the variation of the driving properties by the storage under the sever condition of high temperature or high humidity or by folding can be made as small as possible and the toughness can be raised by the discovery of specific a binder and a binder hardening material.

The displaying medium of the invention is described in detail below.

The displaying medium according to the invention is constituted by a substrate provided thereon a constituting layer which comprises a binder and a liquid crystal composition dispersed in the binder.

Binder

As the binder for the displaying medium according to the invention, a hydrophilic polymer is preferably employed. For example, the binders described in Research Disclosure, hereinafter referred to as RD, vol. 176, Item/17643, December 1978 and RD vol. 308, Item/308119, December 1989, and those described in Tokkai Sho 64-13546, p. 71-75 are employable.

The binder suitable for the invention is transparent or translucent and generally colorless, and a natural polymer a synthesized polymer or another film formable medium such as gelatin, gum arabic, poly(vinyl alcohol), hydroxyethyl cellulose, cellulose acetate, cellulose acetate butylate, poly(vinyl pyrrolidone), casein, starch, poly(acrylic acid), poly(methyl methacrylate), poly(vinyl chloride), poly(methacrylic acid), styrene-maleic anhydride copolymer, styrene-acrylonitrile copolymer, styrene-butadiene copolymer, a poly(vinyl acetal) such as poly(vinyl formal) and poly(vinyl butyral), a poly ester, a polyurethane, a phenoxy resin, poly(vinylidene chloride), a polyepoxide, a polycarbonate, poly(vinyl acetate), a cellulose ester and a polyamide are employable. In the invention, the binder may be either hydrophilic or hydrophobic and a hydrophobic transparent binder can be employed within the range in which the binder is not dissolved with the liquid crystal composition. For the hydrophobic transparent binder, for example, poly(vinyl butyral), cellulose acetate, cellulose acetate butylate, polyester, polycarbonate, poly(acrylic acid) and polyurethane are employable. Among the hydrophobic binder, poly(vinyl butyral), cellulose acetate, cellulose acetate butylate and polyester are preferably employed.

These binders may be employed in combination of two or more kinds thereof. The coating amount of the binder is preferably not more than 100 g per square meter, and an amount of not more than 20 g, per square meter is suitable.

The binder relating to the invention is important for maintaining the strength of the layer containing the dispersed liquid crystals, particularly when facing electrodes are employed, and a resin columnar constitution or a spacer particle may be employed for making uniform the layer thickness but the use of such the materials is not preferable for simplifying the production process. Gelatin is a preferable binder for obtaining the constituting layer through the processes of dissolving by heating, coating, setting by cooling and drying, and an example other than gelatin such as poly(vinyl alcohol) can be employed in the same processes as gelatin by the employing together with a polysaccharide such as carrageenan and geran gum. In such the case, the constituting layer having a uniform thickness.

Other than the above, an aqueous dispersion of a polyurethane resin, a polyacryl resin or a silicone resin, a photohardenable resin, a thermally hardenable resin and a thermoplastic resin are employable.

Hardening of Gelatin or Derivative Thereof

The displaying medium of the invention is characterized in that at least one of the binders is hardened gelatin or a derivative thereof.

Gelatin employable in the invention includes acid processed gelatin, alkali processed gelatin, enzyme processed gelatin treated by an enzyme in the production process thereof and a gelatin derivative which may be one having an amino group, an imino group, a hydroxyl group or a carboxyl group and modified by a reagent having a group capable of reacting with such the groups. The general production method of gelatin is well known and descriptions of, for example, T. H. James "The Theory of Photographic Process" 4$^{th}$ ed., p. 55, 1977, Mcmillan Co. Ltd., "Kagaku Shashin Binran (Photographic Science Hand Book)" p.p. 72-75, Maruzen Co., Ltd., and "Shashin Kougaku no Kiso (Basic photographic Technology)—Gin-En Shashin Hen (Part of Silver Salt)" can be referred.

Examples of hardener preferably employed when gelatin is used as the binder in the invention include those described in U.S. Pat. Nos. 4678739, column 41, and 4791042, Tokkai Sho 59-116655, 62-245261, 61-18942, 61-249054 and 61-245153, and Tokkai Hei 4-218044. In concrete, an aldehyde type hardener such as form aldehyde, an aziridine type hardener, an epoxy type hardener, a vinylsulfone type hardener such as N-N'-ethylene-bis(vinylsulfonylacetoamido) ethane, an N-methylol type hardener such as dimethylol urea, boric acid, metaboric acid and a polymer hardener such as the compounds described in Tokkai Sho 62-234157 are employable. Among these hardeners, the vinyl sulfone type hardener and chlorotriazine type are preferably employed singly or in combination thereof. These hardeners are employed in an amount of from 0.001 to 1 g, and preferably from 0.005 to 0.5 g, per gram of the binder.

The gelatin derivatives employable in the invention include an amino group-inactivated gelatin. The amino group-inactivated gelatin is gelatin of which amino group is chemically inactivated, which is described in, for example, U.S. Pat. Nos. 2,691,582, 2,614,928 and 2,525,753. Examples of them include acylated gelatin, deaminated gelatin and gelatin added with an isocyanate. Preferable deaminated gelatin is the acylated gelatin and the gelatin added with an isocyanate. The acrylate gelatin is a gelatin prepared by treating common gelatin with an acylating agent, examples thereof include acetylated gelatin, phthalated gelatin and benzoylated gelatin. Typical example of the gelatin added with an isocyanate is phenyl isocyanated gelatin. In the deaminated gelatin, the ratio of the blocked amino group is from 10 to 100%, and preferably from 50 to 100%. The above gelatin and the deaminated gelatin may be employed singly or in combination.

The hardener preferably employed in the invention is a compound represented by the following Formula 1.

$$L\text{-}(SO_2\text{---}X)_m \quad \text{Formula 1}$$

In the above Formula 1, L is an m-valent linking group; X is a —CH=CH$_2$ group or a —CH$_2$CH$_2$Y and Y is a group releasable in a form of HY by a base. M is an integer of from 2 to 10, and plural —SO$_2$—X groups may be the same or different. The m-valent linking group L is an m-valent group formed by combining one or plural bonds, for example, an aliphatic hydrocarbon group such as an alkylene group, an alkylidene group, an alkylidine group and a group formed by bonding these groups, an aromatic hydrocarbon group such as an arylene group and a group formed by bonding the arylene groups, an —O— atom, an —NR'— group in which R' is a hydrogen atom or an alkyl group preferably having to 15 carbon atoms, an —S— atom, an =N< atom, a —CO— group, an —SO— group, an —SO$_2$— group or a —SO$_3$— group, and when two or more the —NR'— groups are contained, the plural R's may be bonded with together to form a ring. The linking group L includes one having a substituent such as a hydroxyl group, an alkoxyl group, a carbamoyl group, a sulfamoyl group, an alkyl group and an aryl group. Preferable examples of X include a —CH=CH$_2$ group and a —CH$_2$CH$_2$Cl group.

Typical examples of a Vinylsulfone type hardener represented by Formula 1 are listed below.

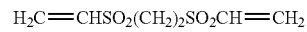

VS-1

H$_2$C=CHSO$_2$CH$_2$SO$_2$CH=CH$_2$

VS-2

H$_2$C=CHSO$_2$(CH$_2$)$_2$SO$_2$CH=CH$_2$

VS-3

H$_2$C=CHSO$_2$(CH$_2$)$_3$SO$_2$CH=CH$_2$

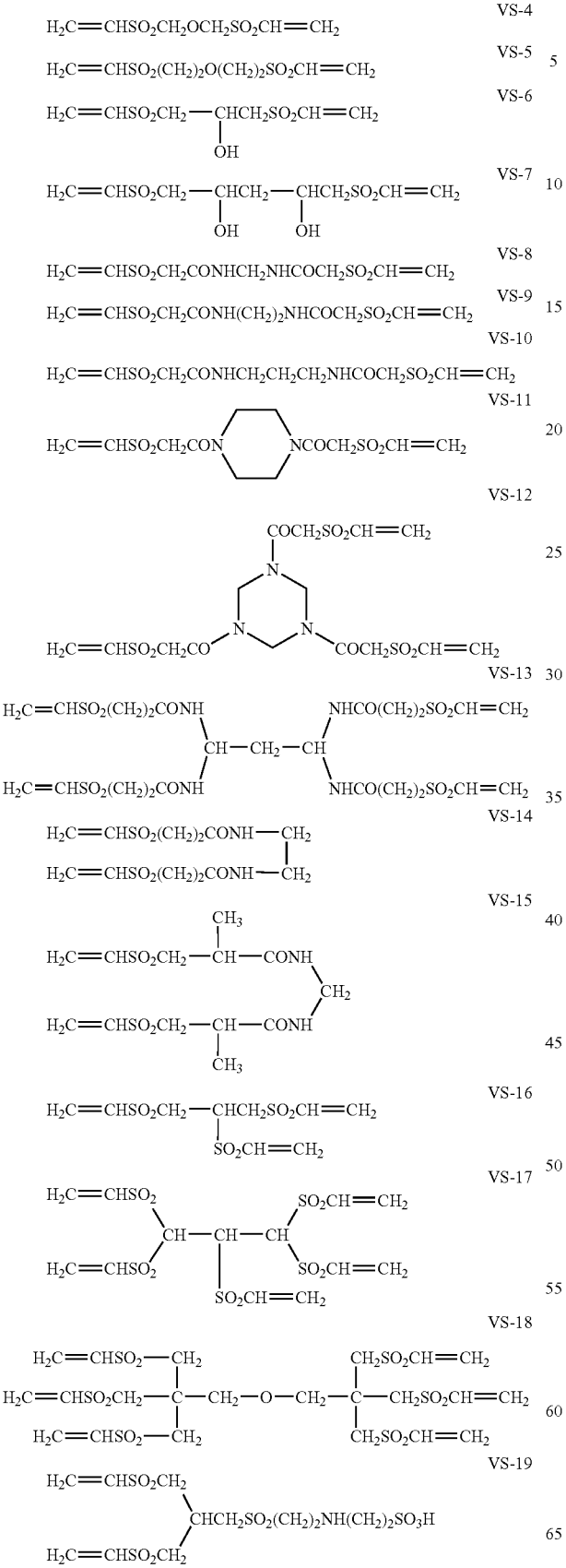
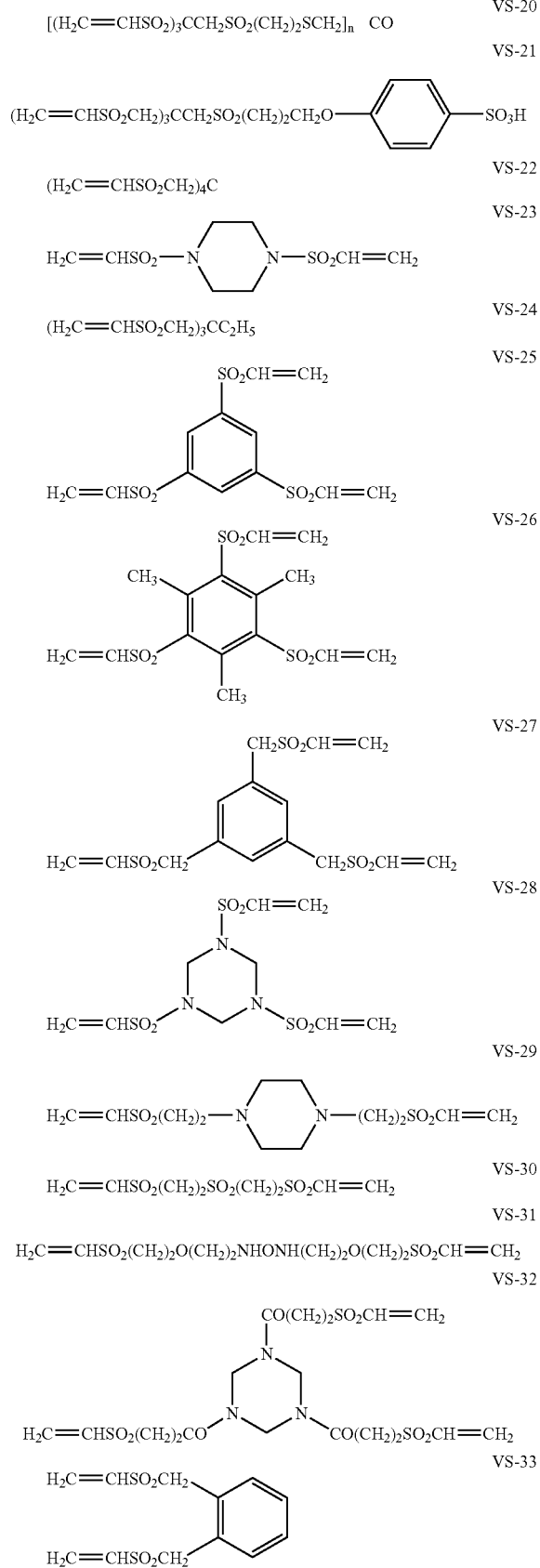

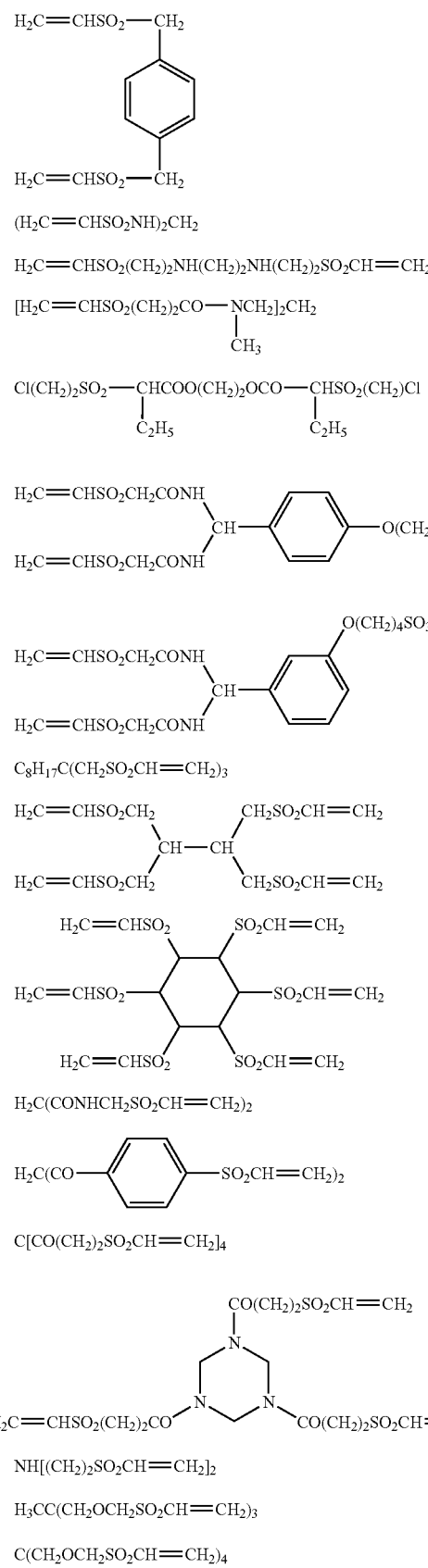
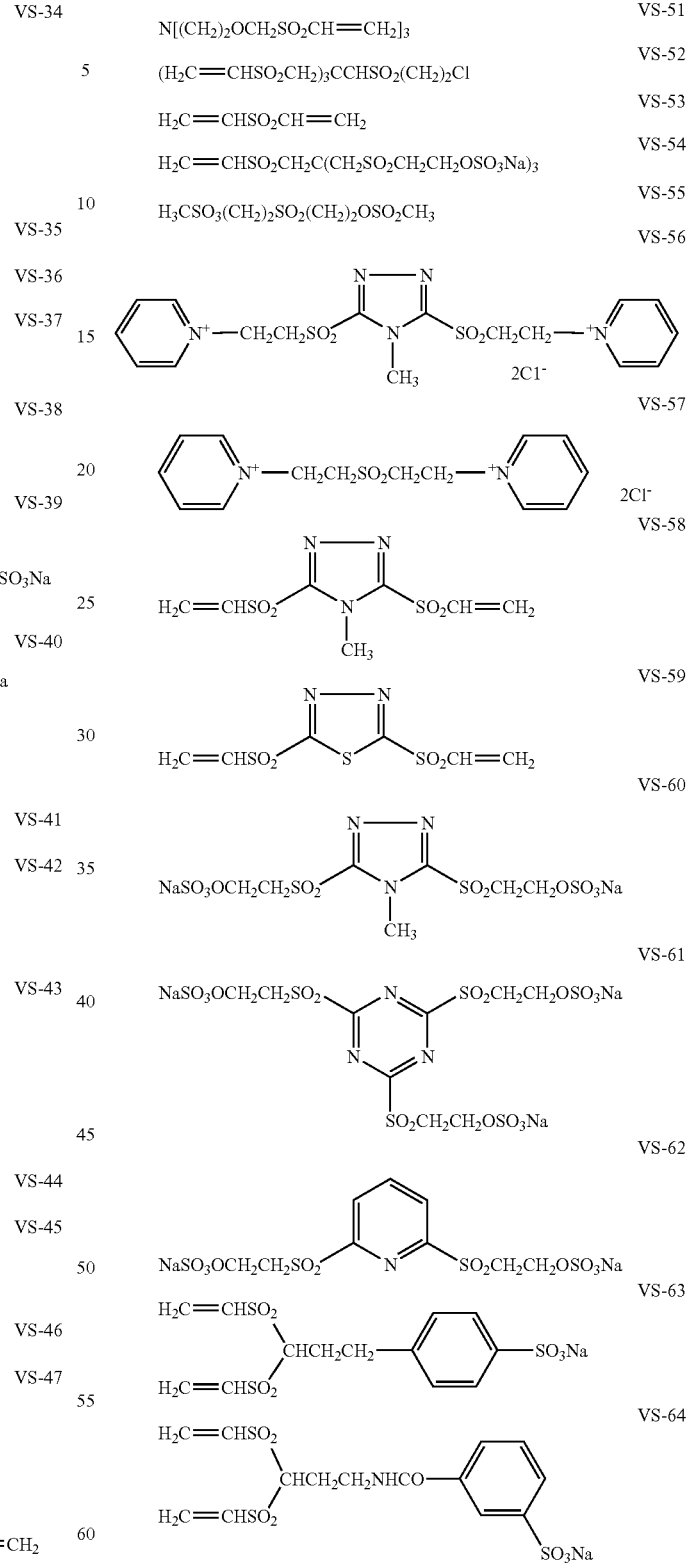
The vinylsulfone type hardener employable in the invention includes, for example, aromatic compounds such as those described in German Patent No. 1,100,942 and U.S. Pat. No. 3,490,911, alkyl compounds bonded with a hetero atom such as those described in Tokko Sho 44-29622, 47-25373 and 47-24259, sulfonamide and ester type compounds such as those described in Tokko Sho 47-8736, 1,3,5-tris[β-(vinylsulfonyl)-propionyl]-hexahydro-s-triazine described in Tokkai Sho 49-24435, alkyl compounds such as those described in Tokko Sho 50-35807 and Tokkai Sho 51-44164, and compounds described in Tokkai Sho 59-18944.

These Vinylsulfone type hardeners are dissolved in water or an organic solvent and employed in an amount of from 0.001 to 0.200, particularly preferably from 0.001 to 0.050, in weight ratio to the binder capable of reacting with the hardener.

Among the Vinylsulfon type hardener relating to the invention, ones having a hydroxyl group in the molecule thereof is preferably employed. In the invention, a hardener, for example, an aldehyde type hardener such as formaldehyde, an aziridine type hardener, an epoxy type hardener and an N-methylol type hardener such as dimethylolurea can be employed in combination with the vinylsulfone hardener.

Poly(vinyl alcohol) or derivative thereof and hardening thereof.

The displaying medium according to the invention characterized in that at least one kind of the binder is hardened poly(vinyl alcohol) or a hardened polyvinyl alcohol derivative.

Polyvinyl alcohol preferably employable in the invention include usual poly(vinyl alcohol) prepared by hydrolyzing poly(vinyl acetate), a modified poly(vinyl alcohol) such as poly(vinyl alcohol) cationically modified at the terminals thereof, an anionically modified poly(vinyl alcohol) having an anionic group, and a poly(vinyl alcohol) derivative.

As the poly(vinyl alcohol) obtained by hydrolyzing poly(vinyl acetate), one having an average polymerization degree of not less than 1,000, and particularly preferably from 1,500 to 5,000, is employed. The saponification degree is preferably from 70 to 100%, particularly preferably from 80 to 99.5%. As the cation-modified poly(vinyl alcohol), for example, a poly(vinyl alcohol) having a primary, secondary or tertiary amino group or a quaternary ammonium group on the principal chain or the side chain thereof such as those described in Tokkai Sho 61-10483 is usable, such the compounds can be obtained by saponification of a copolymer of an ethylenic unsaturated monomer having a cationic group and vinyl acetate. Examples of the ethylenic unsaturated monomer having a cationic group include trimethyl(2-acrylamido-2,2-dimethylethyl)ammonium chloride, trimethyl(3-acrylamido-3,3-dimethylpropyl)ammonium chloride, N-vinylimidazole, N-vinyl-2-methylimidazole, N-(3dimethylaminopropyl)-methacrylamide, hydroxylethyltrimethylammonium chloride, N,N,N-trimethyl-(3-methacrylamidopropyl)ammonium chloride, and N-(1,1-dimethyl-3-dimethylaminopropyl)acrylamide. The ratio of the cationic modifying group-containing monomer in the cation-modified poly(vinyl alcohol) is from 0.1 to 10 mole-%, and preferably from 0.2 to 5 mole-%, of vinyl acetate. As the anion-modified poly(vinyl alcohol), for example, poly(vinyl alcohol) having a anionic group such as those described in Tokkai Hei 1-206088, copolymer of poly(vinyl alcohol) and a vinyl compound having a water-solubilizing group such as those described in Tokkai Sho 61-237681 and 63-307979, and modified poly(vinyl alcohol) having a water-solubilizing group such as those described in Tokkai Hei 7-285265 are employable. As the nonionic-modified poly(vinyl alcohol), for example, a poly(vinyl alcohol) derivative in which a polyalkylene oxide group is added to a part thereof described in Tokkai Hei 7-7958 and a block copolymer of a vinyl compound having a hydrophobic group and vinyl alcohol described in Tokkai Hei 8-25795 are employable. The poly(vinyl alcohol) may be employed in combination of two or more kinds of them different from each other in the polymerization degree or the kind of modification.

As the hardener for hardening the poly(vinyl alcohol) or the poly(vinyl alcohol) derivatives, boric acid and its salt can be employed and a compound having a group capable of reacting with the water-soluble binder or a compound accelerating the reaction between different groups included in the water-soluble binder are suitably selected according to the kind of the water-soluble binder. Concrete examples of the hardener include an epoxy type hardener such as diglycidyl ethyl ether, ethylene glycol diglycidyl ether, 1,4-butanediol glycidyl ether, 1,6-diglycidylcyclohexane, N,N-diglycidyl-4-glycidyloxyaniline, sorbitol polyglycidyl ether and glycerol polyglycidyl ether, an aldehyde type hardener such as formaldehyde and glyoxal, a reactive halogen type hardener such as 2,4-dichloro-4-hydroxy-1,3,5-s-triazine, a reactive vinyl type hardener such as 1,3,5-trisacroyl-hexahydro-1,3,5-s-triazine and bisvinylsulfonyl methyl ether, and aluminum alum. Boric acid and its salt is an oxygen acid or its salt having a boron atom as the central atom, concrete examples of which include orthoboric acid, biboric acid, metaboric acid, tetraboric acid, pentaboric acid, octaboric acid and their salts. The boric acid and its salt having the boron atom as the hardener may be employed singly or in combination of two or more kinds thereof in a state of aqueous solution. A mixture solution of boric acid and borax is particularly preferred. Though each of boric acid and borax can separately form an aqueous solution with relatively low concentration, they can be form a high concentration aqueous solution by mixing them so that the concentration of the coating liquid can be raised. Such the solution further as an advantage of that the pH of the adding solution can be relatively freely controlled. The adding amount of the above hardener is preferably from 1 to 200 mg, and more preferably from 2 to 100 mg, per gram of the water-soluble binder.

Photo-hardening of poly(vinyl alcohol) or poly(vinyl alcohol) derivative

The poly(vinyl alcohol) or the poly(vinyl alcohol) derivative relating to the invention is preferably hardened by photo-hardening. Known examples of photo-hardenable poly(vinyl alcohol) compounds include poly(vinyl alcohol) type photosensitive resin having a styryl derivative group as a pendant which has a quaternary aromatic nitrogen-containing heterocyclic ring disclosed in Tokko Sho 56-5761 and 56-5762, Tokkai Sho 56-11906 and 59-17550, Tokkai Hei 2-118575, Tokko Hei 2-276806 and Tokkai Hei 6-34645. Moreover, Tokkai Sho 63-108045 discloses a polyvinyl type photosensitive resin constituted by poly(vinyl alcohol) (PVA) having a styryl derivative having a quaternary aromatic nitrogen-containing heterocyclic ring and an azide compound as a pendant. Photo-crosslinking type poly(vinyl alcohol) described in Tokkai Hei 8-320553, 9-114092 and 9-160240 are also usable.

Microcapsule

The liquid crystal composition can be used in a form of included in a microcapsule.

The microcapsule applicable in the invention can be prepared by a known method such as a coacervation method, a surface polymerization method and an in-situ method. Among them, the coacervation method is preferably applied since the chemical influence to the oil phase liquid crystal composition is small.

When gelatin is employed as one of the binders, gelatin can be made coacervation by hydrophobic interaction with gum arabic, sodium alginate, carrageenan, carboxymethyl cellulose, agar, poly(vinylbenzenesulfonic acid), a maleic anhydride copolymer or a surfactant. After the coacervation, the gelatin complex layer of the coacervate can be hardened by formaldehyde or the foregoing gelatin hardener for raising the strength of the wall of the microcapsule.

In the surface polymerization method, the microcapsule wall can be formed by polymerization of polyamine or polyvalent phenol and polybasic acid halide or polyisocyanate at the interface of the aqueous phase and the oil phase.

In the in-situ polymerization method, the microcapsule can be formed by crosslinking amide resin used for urea-melamine, phenol resin or copolymer thereof with formaldehyde or glutaraldehyde.

The strength of the microcapsule wall can be raised by coexistence of polyethylene, polypropylene, polystyrene, poly(vinyl chloride), vinyl chloride-vinyl acetate copolymer, poly(vinyl butyral), poly(vinyl alcohol), poly(ethylene oxide), poly(propylene oxide), ethylene-vinyl alcohol copolymer, polyacetal, acryl resin, methyl cellulose, ethyl cellulose, phenol resin, fluororesin, silicone resin, diene resin, polystyrene type thermoplastic elastomer, polyolefin type thermoplastic elastomer, polyurethane type thermoplastic elastomer, polyester type thermoplastic elastomer, poly(phenylene ether), poly(phenylene sulfide), poly(ether sulfone), poly(ether ketone), polyallylate, aramide, polyimide, poly-p-phenylene, poly-p-xylene, poly-p-phenylenevinylene, polyhidantoine, poly(parabic acid), polybenzimidazole, polybenzothiazole, polybenzoxazole, or polyquinoxaline.

The microcapsule relating to the invention can be dried and classified after the preparation in a liquid phase. The classification can be performed by a spray dryer, a rotary dryer or a band dryer.

Another constituting member of the displaying medium of the invention I described below.

Substrate

For example, a film of synthesized plastics such as polyolefin such as polyethylene and polypropylene, polycarbonate, cellulose acetate, poly(ethylene terephthalate), poly(ethylene dinaphthalenedicarboxylate), poly(ethylene naphthalate), poly(vinyl chloride), polyimide, poly(vinyl acetal) and polystyrene are preferably employed in the invention for a substrate. Polystyrene having a syndiotactic structure is also preferred. These plastics can be obtained by the methods described in for example, Tokkai Sho 62-117708, Tokkai Hei 1-46912 and 1-178505. Furthermore, a metal substrate such as stainless steel, a paper substrate such as baryta paper and resin coated paper, a plastic film substrate having a reflex layer, and substrates described in Tokkai Sho 62-253195, pp. 29 to 31 are employable. Those described in RD No. 17643, p. 28, RD No. 18716, right column on p. 647 to left column on page 648 and RD No. 307105, p. 879 are also preferably employable. These substrates may be thermally treated at a temperature not more than Tg for difficultly causing curling. The surface of these substrates may be subjected to surface treatment for improving the adhering ability with the other constituting layer. In the invention, a glow discharge treatment, a UV irradiation treatment, a corona treatment and a flame treatment can be applied for the surface treatment. Moreover, ones described in "Kouchi Gijutsu" (Public known technology) No. 5, pp.44-149, Azutech Co., Ltd., March 22, 1991, can be employed. Ones described in RD No. 308119, p. 1009, and "Product Licensing Indek" vol. 92, p. 108, Item Supports are employable. Other than the above, a glass substrate and an epoxy resin substrate in which glass particles are contained by kneading.

Liquid Crystal Composition

The liquid crystal composition relating to the invention is preferably a chiral nematic liquid crystal composition having a cholesteric phase.

The chiral nematic liquid crystal is a typical liquid crystal displaying the cholesteric phase and is obtained by adding a certain amount of chiral material to a nematic liquid crystal. In the chiral nematic liquid crystal, rod-shaped liquid crystal molecules are oriented in a twisted state and form the cholesteric phase. When light is irradiated in a direction parallel with the helical axis of the liquid crystal, light of wavelength of $\lambda$=np is selectively reflected (planer state), in the above $\lambda$ is wavelength, n is an average reflective index of the liquid crystal molecules and p is a distance in which the liquid crystal molecules are twisted for 360°. Besides, when light is irradiated in the vertical direction to the liquid crystal, the light penetrates without reflection (focalconic state). The displaying is performed by applying the selective reflection and the penetration.

The working mode of the reflection type liquid crystal displaying means having the memorizing ability is disclosed in "SID International Symposium Digest of Technical Paper" vol. 20, p. 897. By this working mode, the image is displayed by switching the orientation state of the chiral nematic to the planer state (the state of selectively reflecting light) or the focalconic state (the state of penetrating light). The planer state and the focalconic state are each a stable state. Therefore, the state is semipermanently maintained as long as an external force is not applied, when the liquid crystal is set at anyone of the states. Namely, the liquid crystal is suitable for the reflection type displaying medium having the memorizing ability by which an image once displayed is maintained when the electric power is turned off.

The liquid crystal displaying media described in the foregoing documents each has a constitution in which the chiral nematic liquid crystal is placed between a pair of substrates each having an electrode, and an electric field is applied by the electrodes in the vertical direction to the substrate. The state of the liquid crystal is changed to a designated state (the planer state or the focalconic state) by controlling the strength and/or applying time of the electric field.

When a voltage not less than the threshold value necessary for solving the twist of the liquid crystal is applied for sufficient time, the liquid crystal is entirely become a homeotropic state (a state in which the major axis of the liquid crystal molecules are oriented in the vertical direction to the substrate). This state has no memorizing ability and the liquid crystal is become the twisted state when the electric field is turned off. The liquid crystal is changed from the homeotropic state to planer state when the electric field is suddenly turned off, and to focalconic state when the electric field is gradually turned off.

When pulse voltage not less than that necessary for solving the twist of the liquid crystal (a voltage having a pulse width by which a part of the liquid crystal is changed to the homeotropic state) is applied to the liquid crystal in the focalconic state, the liquid crystal once changed to the homeotropic state is changed to the planer state after the completion of the application of the pulse voltage. The ratio of the liquid crystal changed to the planer state can be controlled (displaying of the intermediate tone) by controlling the width and/or height of the voltage.

A liquid crystal-polymer composite layer using the chiral nematic liquid crystal which selectively reflects red, green, blue, or yellow light when the orientation is planer and is colorless and transparent to light when the orientation is focalconic can be obtained by controlling the helical pitch of the chiral liquid crystal so that the selective reflection wavelength thereof to be blue, green, red or yellow light. A color image displaying liquid crystal device can be obtained by placing thus prepared liquid crystal-polymer composite layer between transparent electrodes. It is preferable that the displaying medium of the invention is constituted by plural kinds of liquid crystal each selectively reflects a kind of light selected from blue, green, red and yellow light.

A liquid crystal-polymer composite layer which displays a light transparent colorless state in the planer orientation and a light scattering state which is seen white in the focalconic state can be obtained by controlling the helical pitch so that the elective reflection wavelength is within infrared region. A white image displaying device can be obtained by placing thus obtained liquid crystal-polymer composite layer between the transparent electrodes.

The relation between the helical pitch p (nm) and the selective reflection wavelength λ (nm) is expressed by the following expression.

$$\lambda = n \times p \quad \text{Formula 1}$$

In the expression, n is an average refractive index or $n^2 = (n1^2 + n2^2)^{1/2}$, n1 is a refractive index to light irradiated in the direction of the major axis of the liquid crystal molecule and n2 is a refractive index to light irradiated in the vertical direction to the major axis of the liquid crystal molecule.

For preparing the white displaying device or color displaying device, for example, a method can be applied, in which a mixture of the liquid crystal and the binder is placed between the substrates and separating the phase of the liquid crystal and that of the binder by hardening by the use of a hardener. In such the case, the thickness of the liquid crystal-binder composite layer can be easily controlled by placing a spacer between the transparent electrodes together with the above mixture.

Plural chiral dopants may be mixed and added to the nematic liquid crystal. The addition of the plural chiral dopants is effective for raising the phase conversion temperature, improving the transparency in the transparent state of the composite layer and particularly for raising the rate of changing from the transparent state and selective reflection state.

In a preferable embodiment of the invention, a first displaying device having a composite layer employing a levorotatory chiral nematic liquid crystal and a second displaying device employing a dextrorotatory chiral nematic liquid crystal having a selective reflection wavelength the same as that of the above composite layer employing the levorotatory chiral nematic liquid crystal are laminated. By such the structure, the reflectance can be raised and good color displaying can be realized. Such the double layer structure is particularly advantageous for the blue displaying device or the red displaying device since the whole color balance is improved by strongly displaying blue color and red color which are lower in the luminosity factor than green color.

Smetic liquid crystal may be added to the liquid crystal-binder composite layer to be employed for the white color displaying device. The transparency of the liquid crystal-binder composite layer is raised and the contrast between the colorless transparent state and the white colored state can be increased by the addition of the smetic liquid crystal.

Though the thickness of the liquid crystal-binder composite layer is not specifically limited, the thickness of the liquid crystal-binder composite layer for the white displaying device is desirably made larger than that of the liquid crystal-binder composite layers for each of the color displaying device.

As concrete compounds taking the cholesteric phase, those described in U.S. Pat. No. 5,695,682 can be cited.

Examples of the scatter type liquid crystal composition employable in the invention include a 4'-substituted 4-substituted-benzoate, a 2-(4-substituted-phenyl)-5-substituted-pyrimidine, a 4'-substituted-biphenyl 4-substituted-cyclohexanecarboxylate, a 4'-substitutedphenyl 4-(4-substituted-cyclohexyl)benzoate, a 4'-substituted-phenyl 4-substituted-cyclohexancarboxylate, a 4-substituted-biphenyl-4'-substituted-cyclohexane, a 4'-substituted-phenyl 4-(4-substituted-cyclohexanecarbonyloxy)benzoate, a 4'-substituted-cyclohexyl 4-(4-substituted-cyclohexyl)benzoate, a 4-substituted-4"-substituted-ter-phenyl, a 4-substituted-4'-substituted-biphenyl, a 4-substituted-phenyl-4'-substituted cyclohexane, liquid crystal compositions described in Tokkai 2001-51260, Tokkai Hei 8-43846 and 7-4950, Tokkai 2000-147476, Tokkai Hei 8-160470 and 10-54996, Tokkai 2002-221709, 2001-92383, 2003-131234, 2004-77754 and 2004-2771; and liquid crystal compositions so-called polymer network liquid crystal (PNLC) or polymer dispersion liquid crystal (PDLC).

In the displaying medium according to the invention, the liquid crystal composition relating to the invention exists in a state of dispersion in the binder. For example, The dispersion can be prepared by mixing the liquid crystal relating to the invention with the chiral material, adding the resultant mixture to a gelatin solution containing a surfactant and dispersing by a known dispersing machine.

For the surfactant to be employed in the above dispersion, an ionic surfactant such as an aliphatic amine salt, an aliphatic quaternary ammonium salt, a benzalconium salt, a benzetonium chloride, a pyridinium salt and an imidazolinium salt are usable.

Examples of an anionic surfactant in clued fatty acid soap, an N-acyl-N-methylglycine salt, an N-acyl-N-methyl-β-alanine salt, an N-acyl-glutaminate, an acylated peptide, an alkylsulfonate, an alkylbenzenesulfonate, an alkylnaphthalenesulfonate, a dialkylsuofosuccinic ester salt, an alkylsulfoacetate, α-olefinsulfonate, an N-acylmethylurethane, a sulfated oil, a higher alcohol sulfate salt, a secondary higher alcohol sulfate salt, an alkyl ether sulfate, a secondary higher alcohol ethoxysulfate, a polyoxyethylene alkylphenyl ether sulfate, a monoglysulfate, an aliphatic acid alkylolamido ether sulfate, a salt of alkyl ether phosphate, a ligninsulfonate, a formaline condensate of naphthalenesulfonate, a formaline condensate of alkylnaphthalenesulfonate, a formalin condensate of specific aromaticsulfonate such as DEMOL C and a formalin condensate of creosote oil-sulfonate.

Examples of an amphoteric surfactant include a carboxybetaine type surfactant, a sulfobetaine type surfactant, an aminocarboxylate and an imidazoliniumbetain.

Examples of a nonionic surfactant include a polyoxyethylene secondary alcohol ether, a polyoxyethylene alkylphenyl ether, a polyoxyethylene sterol ether, a polyoxyethylene lanoline derivative polyoxyehtylene polyoxypropylene alkyl ether, a polyoxyethylene glycerol carboxylate, polyoxyethylene castor oil, a hardened castor oil, a fatty acid ester of polyoxyethylene sorbitol, a polyethylene glycol carboxylate, a fatty acid monoglyceride, a fatty acid ester of polyglycerol, a fatty acid ester of sorbitol, a fatty acid ester of propylene glycol, a fatty acid ester of sucrose, a fatty acid alkanolamide, a polyoxyethylene fatty acid amide, a polyoxyethylenealkylamine, an alkylamine oxide, acetylene glycol, qcetylene alcohol, a block copolymer of ethylene oxide and propylene oxide, acetylene alcohol, and an adduct of alkylphenol and ethylene oxide.

For dispersing, for example, a shearing mixer, a ball mill, a sand mill, an attriter, a roll mill, an agitator, a Henschel mixer, a colloid mill, an ultrasonic homogenizer, a pearl mill, a wet type jet mill or a paint shaker is applicable.

The constitution of displaying medium according to the invention is described below.

Transparent Electrode

In the invention, a transparent electrode may be employed at least as a part of the facing electrodes. As the transparent electrode, any one transparent and electroconductive can be employed without any limitation. For example, indium tin oxide (ITO), indium zinc oxide (IZO), fluorine-doped tin oxide (FTO), indium oxide, zinc oxide, platinum, gold, silver, copper, chromium, carbon, aluminum, silicon, amorphous silicon, magnesium, bismuth silicon oxide (BSO), and a mixture of them are employable. The mixture may be one, for example, constituted by laminating an ITO layer of about 50 nm with a silver layer of about 50 nm.

An electroconductive polymer such as a polythiophen type, a polypyrrole type, a polyaniline type, a polyacetylene type, a polyparaphenylene type, a polyselenophenylene type polymer and a mixture thereof can be employed.

Moreover, the transparent electrode can be prepared by dispersing fine powder of ITO baked at a temperature of from 350° C. to 800° C. in a solution containing a solvent and a polymer material, coating the resultant dispersion on the substrate and evaporating the solvent or hardening the polymer material. In such the case, the hardening temperature after the coating is preferably from 40° C. to 200° C. For example, the fine powder of ITO can be prepared by a method in which an aqueous solution of tin chloride and that of indium chloride are mixed and ammonia is added to the mixture to cause co-precipitation while maintaining pH at 9, thus obtained precipitation of hydroxide was separated, washed and then baked at 500° C. for 2 hours. A fine powder having an optional mixing ratio can be prepared by varying the mixing ratio of tin chloride and indium chloride. The shape of the fine powder may be any of granules, needle-like, planar and flake, and a mixture of needle-like powder and granule powder may be employed in a form of mixture.

A method is preferably utilized, in which a coating liquid containing xylene and about 10% of a mixture of an organic indium compound and an organic tin compound in a weight ratio of 97:3 is coated on a substrate, solidified by evaporation of solvent and baked at a temperature of from 100° C. to 150° C.

A polymer such as a chemical specie capable of forming polyurethane resin containing a blocked isocyanate and that capable of forming epoxy resin may be added to the above coating liquid.

The surface resistance of the transparent electrode is preferably not more than 500 Ω/□, and particularly preferably not more than 300 Ω/□. The thickness of the layer is preferably from 0.2 μm to 50 μm.

Preparation of Electrode

Known methods can be applied for preparing the transparent electrode or the metal electrode. For example, the electrode can be formed by evaporating through a mask onto the substrate by a spattering method or the electrode may be patterned by a photolithographic method after uniformly forming on the substrate. Moreover, the electrode can be also formed by an electrolytic plating method, a non-electrolytic plating method, a printing method or an ink-jet method.

The metal electrode pattern can be formed by a method in which an electrode pattern of layer containing a catalyst capable of polymerizing monomer is formed by the ink-jet method and then a monomer capable of forming an electroconductive polymer after polymerized by the catalyst is supplied to form an electroconductive polymer layer, after that, the resultant electroconductive polymer layer is plated by a metal such as silver. The process can be considerably simplified by such the method since any photoresist or mask pattern is not employed.

Known methods such as a dipping method, a spinner method, a spraying method, a roller coater method, a flexographic printing method and a screen printing method can be applied when the electrode material is formed by coating.

The displaying medium of the invention may have a constitution containing no electrode and the transparent electrode. For example, the optical state of the liquid crystal composition can be changed by externally giving an electric field to a medium constituted by a providing a layer containing the liquid crystal on the substrate. Furthermore, the displaying medium of the invention may have a constitution including a charge generation layer described in Tokkai 2003-5671.

Electrostatic Ink-Jet Method

In the displaying medium of the invention, it is preferable that at least one of the electrodes is formed by using a liquid extruding apparatus including a liquid jetting head having a nozzle with an inner diameter of not more than 30 μm for jetting an electrified liquid, a supplying means for supplying the liquid into the nozzle and a jetting voltage applying means for applying a jetting voltage to the liquid in the nozzle.

Moreover, the jetting apparatus preferably has a convex meniscus forming means for forming convexly raised state of the liquid at the pointed end of the nozzle.

It is also preferable to employ a liquid jetting apparatus which has a controlling means for controlling the driving voltage for driving the convex meniscus forming means and the jetting voltage supplied by the jetting voltage supplying means, and the controlling means includes a first jetting controlling means by which the convex meniscus forming means driving voltage is applied at the jetting of the liquid droplet while applying the jetting voltage by the jetting voltage applying means.

It is preferable embodiment to employ a liquid jetting apparatus which has the convex meniscus forming means and the controlling means for controlling the voltage applied by the jetting voltage applying means and the controlling means has a second jetting controlling means by which the action for raising the liquid by the convex meniscus forming means and the application of the jetting voltage are synchronously performed; or to employ a liquid jetting apparatus having a liquid surface stabilizing means by which an action for falling in the liquid surface at the point end of the nozzle after the liquid face raising action and the jetting voltage application.

The electrode excellent in the on-demand suitability and the dimension precision can be prepared and waste materials can be reduced by applying such the electrostatic jetting method.

Light Shielding Layer

A light shielding layer can be provided. The light shielding can be carried out by any method such as a metal reflection plate, a scattering plate, coating a colored paint on the substrate or providing a binder layer containing a colorant such as pigment or dye. In the invention, it is preferable to provide the light shielding layer between the facing pair of electrodes. In such the case, suitable black image display with high light absorbance can be performed by providing a layer containing a black dye or a layer in which carbon black or black pigment is dispersed. When a resin substrate having the transparent electrode is employed as the facing electrodes, a colored member can be provided on the substrate surface opposite to the liquid crystal layer. The color of the light to be shielded may be black for the black image display or a filter color compensating the color of the light reflected by the liquid crystal. In the invention, it is preferable to employ the hardened hydrophilic polymer the same as that in the other constituting layer for the binder of the shielding layer. By such the constitution, the storage ability and the stability of the displaying properties under the severe condition of high temperature and high humidity or when subjected to folding are considerably improved which are the object of the invention.

Displaying Medium Driving Method

In the displaying medium of the invention, the driving operation of the foregoing facing electrodes is preferably a simple matrix drive.

In the invention, the simple matrix drive is a driving method in which voltage is successively applied to a circuit formed by vertically crossing of an anode line containing plural anodes to a facing cathode line containing plural cathodes. The use of the simple matrix driving has the advantage that the circuit construction and the driving IC can be simplified so as to reduce the production cost. For driving the displaying medium of the invention, the driving circuit and the driving wave shape can be applied described in, for example, Tokkai 2003-5222, 2003-228045, 2002-14323, 2003-29301 and 2002-287135.

In the displaying medium of the invention, an active matrix drive can be applied. The active matrix drive is a system driven by TFT circuits provided at each of the mesh of the grid constituted by a scanning line, a data line and an electric current supplying line. The active matrix driving method makes advantage on the gradation reproduction and the memorizing ability since switching can be performed for each pixel.

Examples of concrete constitution of the displaying medium are described below referring the drawings, but the invention is not limited to the examples.

In the displaying medium of the invention, the constitution is preferable in which the binder and the liquid crystal composition dispersed in the binder are arranged between a pair of electrodes.

FIG. 1 shows the cross section of an example of a color displaying medium having plural layers each containing a dispersed liquid crystal compound.

The displaying medium shown FIG. 1a has a first electrode 1 and a second electrode 6 and the second electrode 6 positioned on the lower side or the viewing side is preferably a transparent electrode.

Three constituting layers 5 are arranged between the facing the first electrode 1 and the second electrode 6 and a red light reflective liquid crystal composition 2, and green light reflective composition 3 and blue light reflective composition 4 each dispersed in the binder are contained in each of the constituting layers, respectively. These color light reflective liquid crystal compositions can display by suitably controlling the amount of the chiral dopant to be added to the nematic liquid crystal and the threshold voltage to be applied between the first electrode 1 and the second electrode 6. Moreover, it is preferable to provide a color filter layer 7 for color compensation between each of the constituting layers as shown in FIG. 1b for removing the irregular light absorption of each of the color light reflective liquid crystal compositions and realizing suitable color reproduction. The arrangement of the green, blue and red constituting layers 5 can be optionally selected according to the spectral property of each of the liquid crystal compositions.

In the displaying medium of the invention, it is one of the preferable embodiments that the same constituting layer contains plural kinds of the liquid crystal.

Figure 2:
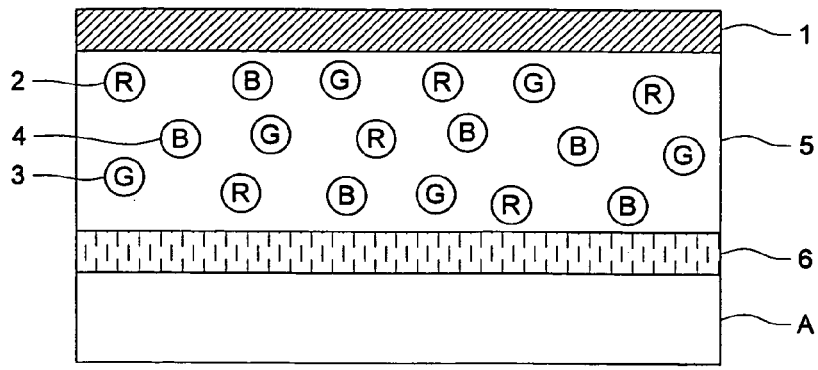
FIG. 2 shows a cross section of an example of the constitution of an image displaying medium containing three-color light reflective liquid crystal compositions in a single layer.
Figure 2:
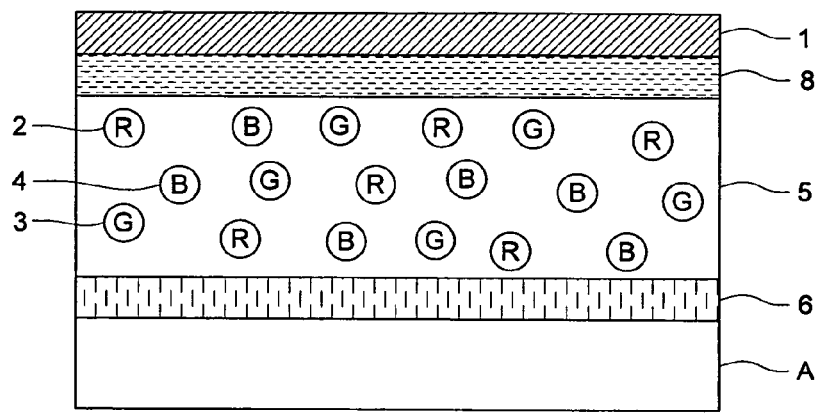
Figure 2:
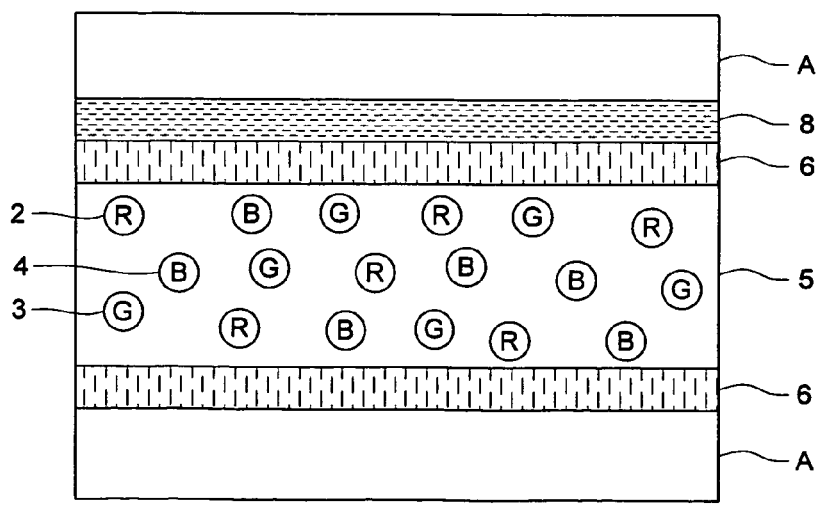

FIG. 2 shows the cross section of an example of displaying medium in which three color reflective liquid crystal compositions are contained in a single constitution layer.

In constitution of the displaying medium shown in FIG. 2a, a single constituting layer 5 is arranged between the first electrode 1 and the second electrode 6 and the constituting layer 5 contains the red light reflective liquid crystal composition 2, green liquid crystal composition 4 and blue liquid crystal composition 4 dispersed in the binder.

FIG. 2b shows an embodiment in which a black light shielding layer 8 is provided between the constituting layer 5 and the first electrode 1. By applying such the constitution, suitable black image display with high light absorbing efficiency can be performed. FIG. 2c shows an embodiment in which substrates A are arranged at the both sides and a black light shielding layer 5 is placed between the substrate A and the second electrode 6 provided at the position farther from the viewing surface.

Figure 3:
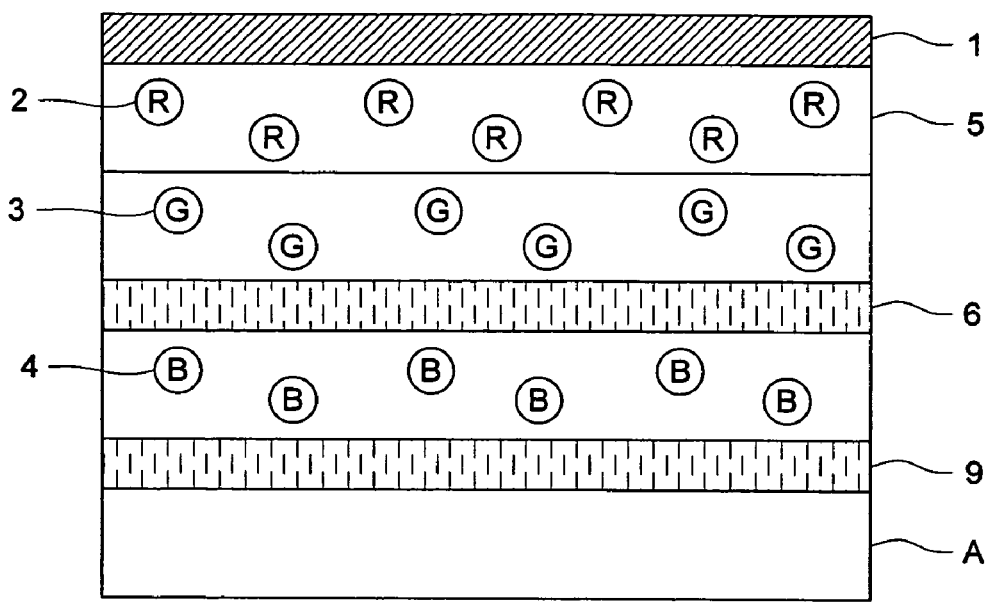
FIG. 3 shows a cross section of an example of the constitution of a color image displaying medium which is constituted by two or more electrodes and contains a liquid crystal compound.
Figure 3:
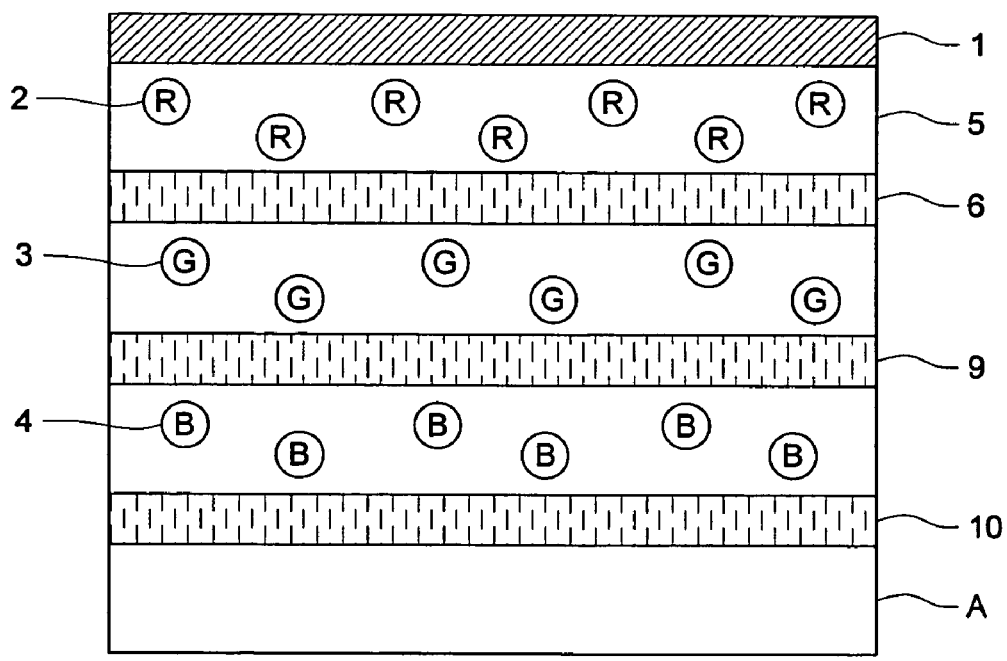

FIG. 3 shows the cross section of an example of constitution of a color displaying medium having two or more pairs of electrodes and plural constituting layers each containing the liquid crystal compound.

FIG. 33 shows an example of the embodiment the same as that shown in FIG. 1a except that an electrode is newly provided between the constituting layer containing the green light reflective liquid crystal 3 and that containing the blue light reflective liquid crystal composition 2, and FIG. 3b shows an example of the displaying medium in which each of the constituting layers is placed between a pair of the electrodes. The electrodes 6, 9, 10 are each a transparent electrode.

The constitutions of the above described displaying media shown in FIGS. 1 to 3 preferably applied for color display even though they may be employed for displaying black-and-white image.

Figure 4:
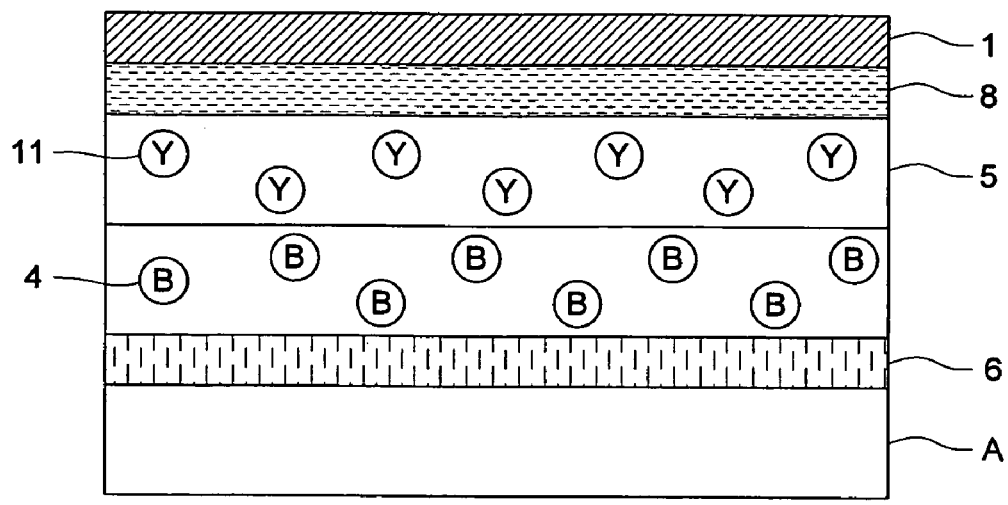
FIG. 4 shows an example of the constitution of a black-and-white displaying medium.
Figure 4:
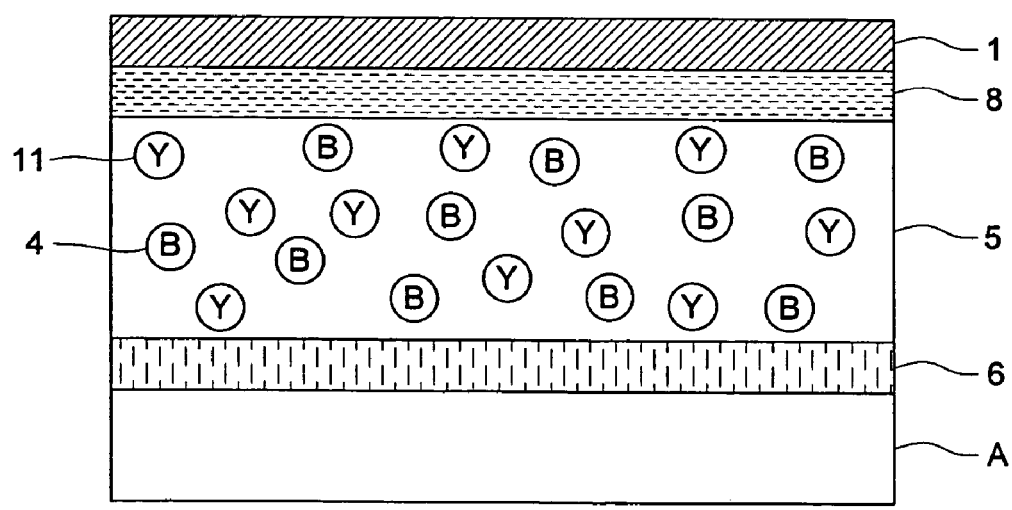

FIG. 4 shows an example of the constitution of a black-and-white displaying medium.

The displaying medium shown in FIG. 4a has two constituting layers 5 between the first electrode 1 and the second electrode 6 for displaying white and black colors in which one of the constituting layers contains the blue light reflective liquid crystal composition 4 and the other constituting layer contains yellow light reflective liquid crystal composition 11 reflecting light of complementary color to the color of reflected by the liquid crystal composition 4. In this embodiment, a black light shielding layer 8 is provided between the first electrode 1 and the constituting layer 5; the light absorption efficiency can be raised by such the constitution for displaying suitable black image. Though an example of black displaying by the blue light reflective liquid crystal composition 4 and the yellow light reflective liquid crystal composition is shown in FIG. 4a, a combination of a green light reflective liquid crystal composition and a magenta light reflective liquid crystal composition or a combination of a red light reflective liquid crystal composition and a cyan light reflective liquid crystal composition may be applied.

FIG. 4b shows an embodiment in which the blue light reflective liquid crystal composition 4 and the yellow light reflective liquid crystal composition are contained in one layer.

In the displaying medium of the invention, the chiral nematic liquid crystal composition preferably contains a liquid crystal composition giving dextrorotatory or levorotatory selective reflection.

FIG. 5 shows the cross section of an example of black-and-white displaying medium containing the liquid crystal composition giving dextrorotatory or levorotatory selective reflection.

Figure 5A:
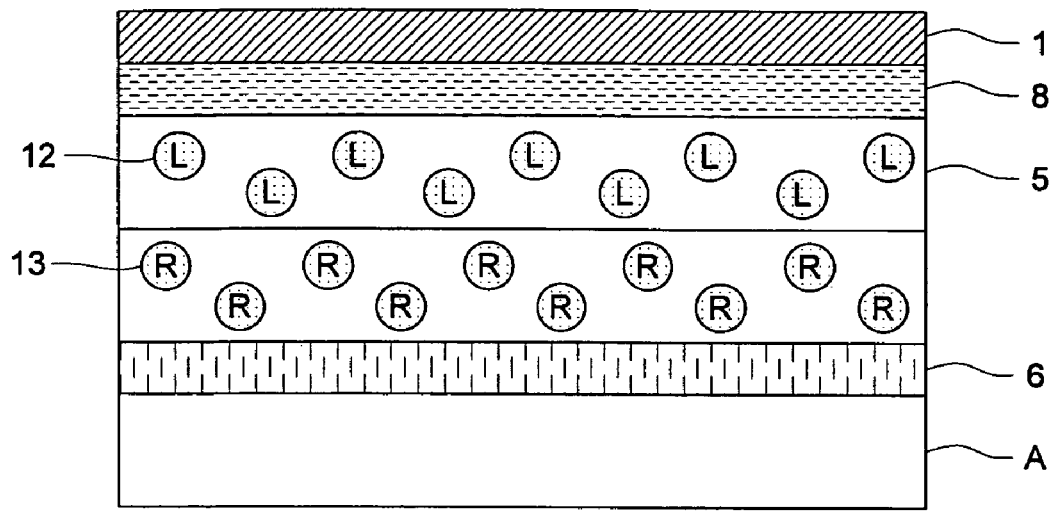
FIG. 5 shows a cross section of an example of the constitution of black-and-white displaying which contains a liquid crystal composition giving dextrorotatory or levorotatory selective reflection.
Figure 5B:
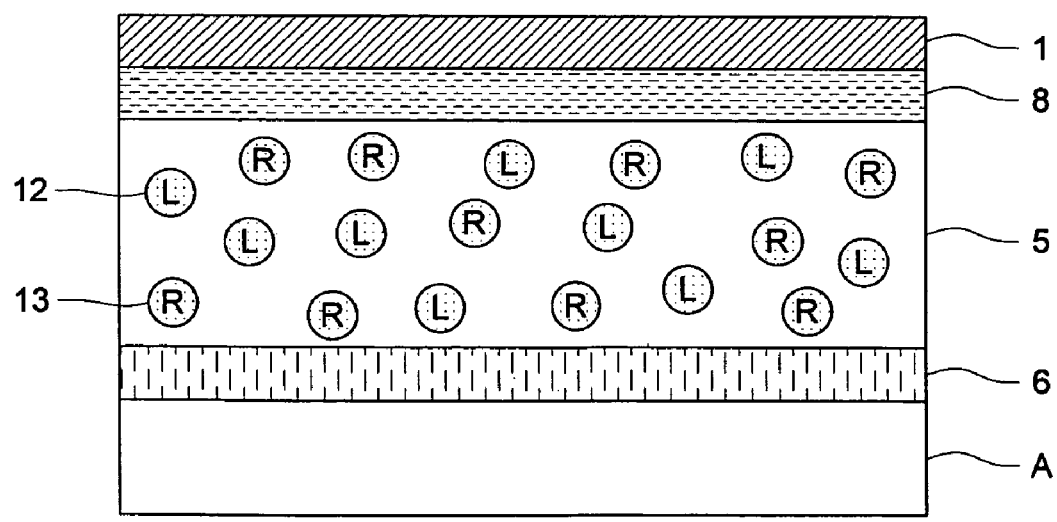

FIG. 5a shows an example in which a levorotatory liquid crystal composition 12 and a dextrorotatory liquid crystal composition 13 are separately contained from each other in independent constituting layers and FIG. 5b shows an example in which the levorotatory liquid crystal composition 12 and the dextrorotatory liquid crystal composition 13 are contained in one constituting layer, both of the embodiments can be applied for black-and-white displaying.

Figure 6:
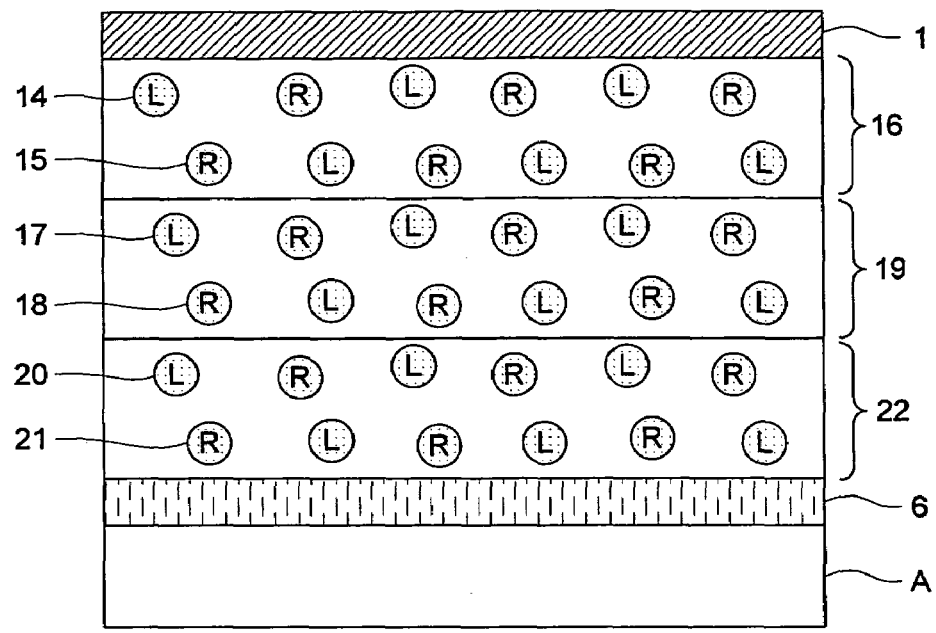
FIG. 6 shows a cross section of an example of the constitution of color displaying medium containing a liquid crystal composition giving dextrorotatory or levorotatory selective reflection.
Figure 6:
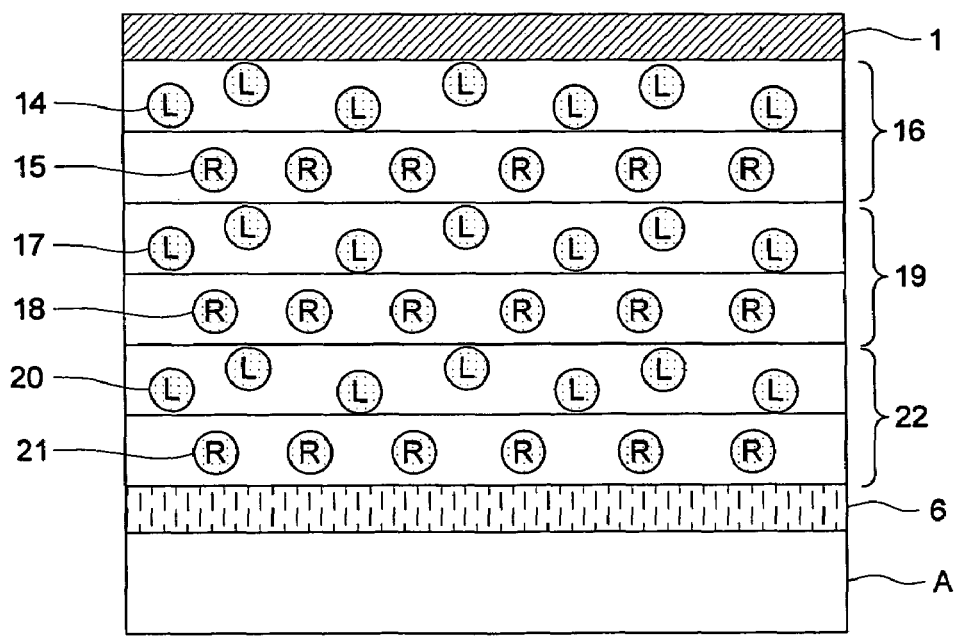

FIG. 6 shows the cross section of an example of constitution of a color displaying medium containing a liquid crystal composition giving levorotatory or dextrorotatory selective reflection.

FIG. 6a shows displaying medium which has the pair of the first electrode 1 and the second electrode 6 on the substrate A and three constituting layers 5 are arranged between the first electrode 1 and the second electrode 6, and the three constituting layers are a red light reflective layer 16 containing a red light reflective levorotatory liquid crystal composition 14 and a red light reflective dextrorotatory liquid crystal composition 15 each dispersed in a binder, a green light reflective layer 19 containing a green light reflective levorotatory liquid crystal composition 17 and a green light reflective dextrorotatory liquid crystal composition 18 each dispersed in a binder, and a blue light reflective layer 22 containing a blue light reflective levorotatory liquid crystal composition 20 and a blue light reflective dextrorotatory liquid crystal composition 21 each dispersed in a binder. FIG. 6b shows an example in which the levorotatory liquid crystal compositions of each color and the dextrorotatory liquid crystal compositions of each color each dispersed in the binder are separately contained in independent layers, respectively.

Application Field of Displaying Media of the Invention

The displaying media according to the invention can be applied in the field relating to the ID card, that relating to public service, traffic, broadcasting, accounting and commodities distribution. In concrete, the medium can be applied for a key of door, a student certification card, an employee certification card, a member certification card, a card of convenience store, a card of department store, a car for vending machine, a card for filling station, a card for subway or railway, a bus card, a cash card, a credit card, a highway card, a driving license card, a consultation ticket of hospital, a health insurance certificate card, a resident basic ledger, a passport, an terminal of electronic book, a document viewer and a sign for a guidance board or a bulletin board.

EXAMPLES

The invention is concretely described referring examples below; the invention is not limited to the examples.

Example 1

Preparation of Displaying Medium 1: Comparative Example

Preparation transparent Electrode 1

An ITO (indium tin oxide) layer was uniformly formed on a polyethylene terephthalate substrate having a thickness of 100 μm, and transparent Electrode 1 having an electrode distance of 50 μm and an electrode width of 2 mm was prepared by a photolithographic method.

Preparation of Liquid Crystal Layer Coating Liquid 1

Dextrorotatory green light reflective liquid crystal Composition 1 was prepared by sufficiently mixing 60.0% by weight of nematic liquid crystal BL012 having positive dielectric constant anisotropy, manufactured by Merck Co., Ltd., 20.0% by weight of a dextrorotatory chiral agent CB15, manufactured by Merck Co., Ltd., and 20.0% by weight of a dextrorotatory chiral agent CE2, manufactured by Merck Co., Ltd. On the other hand, 8% by weight of photographic gelatin was added to deionized water and stirred at a room temperature and then stood for 30 minutes for sufficiently swelling. After that, the gelatin was dissolved by raising the temperature by 42° C. To the resultant solution, 12% by weight to water of isopropyl alcohol containing 10% by weight of Alkanol XC (alkylnaphthalenesulfonic acid) was added and then 12% by weight to water of dextrorotatory green light reflective liquid crystal Composition 1 was added. The resultant mixture liquid was stirred by a comb teeth type dispersing machine. Thus a liquid crystal layer Coating Liquid 1A having an average diameter of the dispersed particles of 5 μm was obtained.

Preparation of Displaying Medium

Liquid crystal layer Coating Liquid 1A heated at 42° C. was coated on transparent Electrode 1 so that the layer thickness was 35 μm, and stood just after coating under a condition of 10° C. for gelling the liquid crystal coating liquid and dried while maintaining the jelled state. An aqueous solution containing 5% by weight of gelatin was coated on the above sample and dried, and then an aqueous solution containing 20% by weight of carbon black and 5% by weight of gelatin was coated and dried. On the dried sample, an electrode pattern having an electrode space of 50 μm and an electrode width of 2 mm and crossing at right angles to the electrode pattern of transparent Electrode 1 was formed by a screen printing method employing a silver past ink DW-250H-5 manufactured by Toyobo Co., Ltd., to prepare Displaying Medium 1.

Preparation of Displaying Medium 2: Comparative Example

Liquid crystal layer Coating Liquid 1B was prepared in the same manner as in liquid crystal layer Coating Liquid 1A except that the gelatin was replaced by poly(vinyl alcohol) having a saponification degree of from 87 to 89% and a polymerization degree of 3,500. Displaying Medium 2 was prepared in the same manner as in Displaying Medium 1 except that liquid crystal layer Coating Liquid 1A was replaced by liquid crystal layer Coating Liquid 1B.

Preparation of Displaying Medium 3: Inventive Example

Liquid crystal layer Coating Liquid 1C was prepared in the same manner as in liquid crystal layer Coating Liquid 1A except that 10 mg per gram of gelatin of sodium dichloro-s-triazine was added to the gelatin and a seasoning treatment for 40 minutes at 40° C. and 60% RH was provided after the drying, and Displaying Medium 3 was prepared in the same manner as in Displaying Medium 1 except that liquid crystal layer Coating Liquid 1A was replaced by liquid crystal layer Coating Liquid 1C.

Preparation of Displaying Medium 4: Inventive Example

Liquid crystal layer Coating Liquid 1D was prepared in the same manner as in the liquid crystal layer Coating Liquid 1B except that 50 mg per gram of poly(vinyl alcohol). metaboric acid was added to the solution containing poly(vinyl alcohol), and Displaying Medium 4 was prepared in the same manner as in Displaying Medium 1 except that the liquid crystal layer Coating Liquid 1B was replaced by liquid crystal layer Coating Liquid 1D.

Preparation of Displaying Medium 5: Inventive Example

Liquid crystal layer Coating Liquid 1E was prepared in the same manner as in liquid crystal layer Coating Liquid 1C except that the sodium dichloro-s-triazine was replaced by exemplified compound VS-10. Displaying Medium 5 was prepared in the same manner as in Displaying Medium 1 except that the liquid crystal layer Coating Liquid 1A was replaced by the liquid crystal layer Coating Liquid 1E.

Preparation of Displaying Medium 6: Inventive Example

Liquid crystal layer Coating Liquid 1F was prepared in the same manner as in liquid crystal layer Coating Liquid 1C except that the sodium dichloro-s-triazine was replaced by Exemplified Compound VS-6. Displaying Medium 6 was prepared in the same manner as in the Displaying Medium 1 except that liquid crystal layer Coating Liquid 1A was replaced by the liquid crystal layer Coating Liquid 1F.

Preparation of Displaying Medium 7: Inventive Example

Liquid crystal layer Coating Liquid 1G was prepared in the same manner as in liquid crystal layer Coating Liquid 1F except that the gelatin was replaced by phthalated gelatin with a phthalating ratio of 70%. Displaying Medium 7 was prepared in the same manner as in Displaying Medium 1 except that liquid crystal layer Coating Liquid 1A was replaced by liquid crystal layer Coating Liquid 1G.

Preparation of Displaying Medium 8: Inventive Example

Liquid crystal layer Coating Liquid 1H was prepared in the same manner as in liquid crystal layer Coating Liquid 1B except that the poly(vinyl alcohol) was replaced by the compound represented by the following Formula I. Displaying Medium 8 was prepared in the same manner as in Displaying Medium 1 except that liquid crystal layer Coating Liquid 1A was replaced by liquid crystal layer Coating Liquid 1H and the coated layer was irradiated by light of 5 mW/cm² for 30 seconds before the printing by the silver past.

Formula I

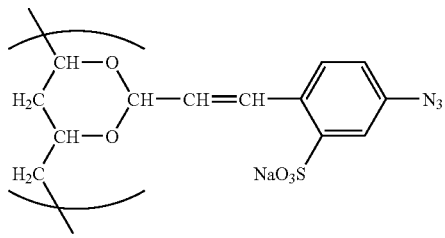

<<Evaluation of Displaying Medium>>
Evaluation on Resistivity Against High Temperature and High Humidity To the electrodes of each of the above obtained displaying media, alternative current of 50 Hz for 250 milliseconds was applied while varying the voltage and the reflectance was measured by a spectrophotometer CM-3700d manufactured by Konica-Minolta Co., Ltd., to determine characteristic voltage values (voltage 1 and voltage 2). Voltage 1 was the phase transition voltage from the planer phase to the homeotropic phase and Voltage 2 was the phase transition voltage from the focalconic phase to the homeotropic phase or the planer phase. On the other hand, the displaying media were subjected to accelerated aging test at 60° C. and 80% RH by standing in a hydrothermostat. And the characteristic voltage values (Voltage 3 and Voltage 4) of the samples after the accelerated aging were measured in the same manner as the above, and the variation ratios of the voltage values (Voltage ratio a=Voltage 3/Voltage 4 and Voltage ratio b=Voltage 4/Voltage 2) were calculated.

Evaluation on Anti-Folding Ability

The both ends of the displaying medium and the position of the fixed ends were varied so that the curvature radius of the medium is made 2 cm and such the operation was repeated for 50 times and then the characteristic voltage values (Voltage 5 and Voltage 6) were measured in the same manner as in the above evaluation on resistivity against high temperature and high humidity, and the variation ratios of the characteristic voltage values (Voltage ratio c=Voltage 5/Voltage 1, and Voltage ratio d=Voltage 6/Voltage 2) were calculated.

The values of the voltage ratios a to d nearer 1 correspond to higher durability of the displaying medium.

Results obtained from the above are listed in Table 1.

TABLE 1

| Displaying medium No. | Resistivity to high temperature and high humidity | | Anti-folding ability | | Remarks |
| --- | --- | --- | --- | --- | --- |
| | Voltage ratio a | Voltage ratio b | Voltage ratio c | Voltage ratio d | |
| 1 | 1.73 | 1.85 | 1.63 | 1.59 | Comp. |
| 2 | 1.69 | 1.64 | 1.55 | 1.51 | Comp. |
| 3 | 1.45 | 1.42 | 1.35 | 1.31 | Inv. |
| 4 | 1.41 | 1.39 | 1.30 | 1.29 | Inv. |
| 5 | 1.24 | 1.22 | 1.19 | 1.23 | Inv. |
| 6 | 1.15 | 1.09 | 1.07 | 1.11 | Inv. |
| 7 | 1.13 | 1.10 | 1.08 | 1.12 | Inv. |
| 8 | 1.21 | 1.19 | 1.14 | 1.20 | Inv. |

Comp.: Comparative example
Inv.: Inventive example

As cleared by the results described in Table 1, the displaying media satisfying the constitution of the invention are superior in the stability under the high temperature and high humidity condition and in the anti-folding ability.

Example 2

<<Preparation of Liquid Crystal Layer Coating Liquid>>
Preparation of liquid crystal layer Coating Liquids 2A through 2H Dextrorotatory yellow light reflective liquid crystal layer Coating Liquids 2A through 2H were prepared in the same manner as in crystal layer Coating Liquids 1A through 1H, respectively, except that liquid crystal Composition 1 was replaced by liquid crystal Composition 2 containing 44.05% by weight of nematic liquid crystal E44, manufactured by Merck Co., Ltd., 19.05% by weight of BL011, manufactured by Merck Co., Ltd., each having positive dielectric constant anisotropy and 36.5% by weight of dextrorotatory chiral agent C15, manufactured by Merck Co., Ltd.

Preparation of Liquid Crystal Layer Coating Liquids 3A through 3H

Dextrorotatory blue light reflective liquid crystal layer Coating Liquids 3A through 3H were prepared in the same manner as in crystal layer Coating Liquids 2A through 2H, respectively, except that liquid crystal composition 2 was replaced by liquid crystal Composition 3 containing 35.35% by weight of nematic liquid crystal E44, manufactured by Merck Co., Ltd., 15.15% by weight of BL011, manufactured by Merck Co., Ltd., each having positive dielectric constant anisotropy and 49.5% by weight of dextrorotatory chiral agent C15, manufactured by Merck Co., Ltd.

Preparation of Liquid Crystal Layer Coating Liquids 4A through 4H

Liquid crystal layer Coating Liquid 4A was prepared by mixing liquid crystal layer Coating Liquid 2A and 3A in a ratio of 1:1.3. Liquid crystal layer Coating Liquids 4B through 4H were each prepared by mixing 2B and 3B, 2C and 3C, 2D and 3D, 2E and 3E, 2F and 3F, 2G and 3G, and 2H and 3H, respectively.

<<Preparation and Evaluation of Displaying Media>>

Displaying Media 9 through 16 were prepared in the same manner as in Displaying Media 1 through 8 except that liquid crystal layer Coating Liquids 1A through 1H were each replaced by liquid crystal coating layer Coating Liquids 4A through 4H, respectively. Provided that 5 mW/cm² of light was irradiated for 30 seconds after the coating and drying of liquid crystal layer Coating Liquid 4H and before the silver paste printing in the preparation of Displaying Medium 16. The prepared displaying media were subjected to evaluation in the same manner as in Example 1. Thus obtained results are shown in Table 2.

TABLE 2

| Displaying medium No. | Resistivity to high temperature and high humidity | | Anti-folding ability | | Remarks |
|---|---|---|---|---|---|
| | Voltage ratio a | Voltage ratio b | Voltage ratio c | Voltage ratio d | |
| 9 | 1.59 | 1.70 | 1.57 | 1.43 | Comp. |
| 10 | 1.55 | 1.59 | 1.50 | 1.39 | Comp. |
| 11 | 1.31 | 1.31 | 1.25 | 1.22 | Inv. |
| 12 | 1.24 | 1.29 | 1.17 | 1.16 | Inv. |
| 13 | 1.14 | 1.13 | 1.10 | 1.13 | Inv. |
| 14 | 1.10 | 1.09 | 1.08 | 1.09 | Inv. |
| 15 | 1.11 | 1.09 | 1.09 | 1.10 | Inv. |
| 16 | 1.14 | 1.12 | 1.11 | 1.17 | Inv. |

Comp.: Comparative example
Inv.: Inventive example

As is cleared by the results described in Table 2, the displaying media satisfying the constitution of the invention are superior in the stability under the high temperature and high humidity condition and in the anti-folding property. Moreover, samples were prepared, in which liquid crystal layer Coating Liquids 2A and 3A, 2B and 3B, 2C and 3C, 2D and 3D, 2E and 3E, 2F and 3F, and 2G and 3G were each coated as separated layers in place of liquid crystal layer Coating Liquids 4A through 4H, and the effects similar to the results described in Table 2 could be confirmed.

Example 3

<<Preparation of Liquid Crystal Layer Coating Liquids>>
Preparation of liquid crystal layer Coating Liquid 5

Liquid crystal composition 4 was prepared by mixing 69.0% by weight of nematic liquid crystal showing positive dielectric constant anisotropy BL012, manufactured by Merck, Co., Ltd., 23.0% by weight of dextrorotatory chiral agent CB15, manufactured by Merck, Co., Ltd., and 15.5% by weight of dextrorotatory chiral agent, manufactured by Merck, Co., Ltd. On the other hand, 4% by weight of photographic gelatin and 1% by weight of gum arabic were added to deionized water and stirred at a room temperature and then stood for 30 minutes for sufficiently swollen and dissolved by heating by 42° C. To the resultant solution, 12% to water of isopropyl alcohol containing 10% by weight of Alkanol XC (alkylnaphthalenesulfonic acid) as a surfactant was added and then 10% by weight of water of liquid crystal Composition 4 added. The resultant mixture was stirred by the comb teeth dispersing machine while maintaining the temperature at 42° C. Thus a liquid crystal dispersion having an average diameter of the dispersed particles of 5 μm was obtained. The pH of the resultant dispersion was adjusted to 4.05 and the dispersion was stirred for 30 minutes. After that, the dispersion was cooled by 8° C. and further stirred for 30 minutes. The dispersion was stirred for 5 minutes after addition of 16 mg per gram of gelatin of Exemplified Compound VS-6 and the pH of the dispersion was raised to 9.0 and stirring was further continued for 30 minutes. After that, the dispersion was heated by 30° C. and stirred for 20 minutes. Thus microcapsule dispersion containing liquid crystal Composition 4 was obtained. A gelatin solution was added to the microcapsule dispersion so that the gelatin concentration was adjusted to 8% by weight of water. Thus liquid crystal layer Coating Liquid 5A containing microcapsules each including the red light reflective liquid crystal composition was obtained.

Liquid crystal layer Coating Liquid 5B was prepared in the same as in liquid crystal layer Coating Liquid 5A except that the gelatin was replaced by poly(vinyl alcohol) having a saponification degree of 87 to 89% and a polymerization degree of 3,500.

Liquid crystal layer Coating Liquid 5C was prepared in the same manner as in liquid crystal layer Coating Liquid 5A except that 10 mg per gram of gelatin of sodium dichloro-s-triazine was added and a seasoning treatment for 4 hours under a condition of 40° C. and 60% HR was provided after the drying.

Liquid crystal layer Coating Liquid 5D was prepared in the same manner as in liquid crystal layer Coating Liquid 5B except that 50 mg per gram of poly(vinyl alcohol) of metaboric acid was added to the solution containing poly(vinyl alcohol).

Liquid crystal layer Coating Liquid 5E was prepared in the same manner as in liquid crystal layer Coating Liquid 5C except that the sodium dichloro-s-triazine was replaced by Exemplified Compound VS-10.

Liquid crystal layer Coating Liquid 5F was prepared in the same manner as in liquid crystal layer Coating Liquid 5C except that the sodium dichloro-s-triazine was replaced by Exemplified Compound VS-6.

Liquid crystal layer Coating Liquid 5G was prepared in the same manner as in liquid crystal layer Coating Liquid 5F except that the gelatin was replaced by the phthalated gelatin.

Liquid crystal layer Coating Liquid 5H was prepared in the same manner as in liquid crystal layer Coating Liquid 5B except that the poly(vinyl alcohol) was replaced by the compound represented by the foregoing Formula I.

Preparation of Liquid Crystal Layer Coating Liquids 6A through 6H

Liquid crystal layer Coating Liquids 6A through 6H each containing the microcapsules which include green light reflective liquid crystal were prepared in the same manner as in liquid crystal layer Coating Liquids 5A through 5H, respectively, except that liquid crystal Composition 4 in liquid crystal layer Coating Liquids 5A through 5H was replaced by liquid crystal Composition 1.

Preparation of Liquid Crystal Layer Coating Liquids 7A through 7H

Liquid crystal layer Coating Liquids 7A through 7H each containing the microcapsules which include green light reflective liquid crystal were prepared in the same manner as in liquid crystal layer Coating Liquids 5A through 5H, respectively, except that liquid crystal Composition 4 in liquid crystal layer Coating Liquids 5A through 5H was replaced by liquid crystal Composition 3.

Preparation of Liquid Crystal Layer Coating Liquids 8A through 8H

Liquid crystal layer Coating Liquids 8A was prepared by mixing the above liquid crystal layer Coating Liquids 5A, 6A and 7A in a weight ratio of 1:1:1. Liquid crystal layer Coating Liquids 8B through 8H were prepared each by mixing 5B, 6B and 7B; 5C, 6C and 7C; 5D, 6D and 7D; 5E, 6E and 7E; 5F, 6F and 7F; 5G, 6G and 7G; and 5H, 6H and 7H, respectively.

<<Preparation and Evaluation of Displaying Media>>

Displaying media 17 through 24 were prepared in the same manner as in displaying media 1 through 8 except that liquid crystal layer Coating Liquids 1A through 1H were each replaced by liquid crystal coating layer Coating Liquids 8A through 8H, respectively. Provided that 5 mW/cm² of light was irradiated for 30 seconds after the coating and drying of liquid crystal layer Coating Liquid 8H and before the silver paste printing in the preparation of Displaying Medium 24. The prepared displaying media were subjected to evaluation in the same manner as in Example 1. Thus obtained results are shown in Table 3.

TABLE 3

| Displaying medium No. | Resistivity to high temperature and high humidity | | Anti-folding ability | | Remarks |
|---|---|---|---|---|---|
| | Voltage ratio a | Voltage ratio b | Voltage ratio c | Voltage ratio d | |
| 17 | 1.40 | 1.65 | 1.51 | 1.40 | Comp. |
| 18 | 1.35 | 1.49 | 1.36 | 1.31 | Comp. |
| 19 | 1.27 | 1.25 | 1.22 | 1.21 | Inv. |
| 20 | 1.20 | 1.22 | 1.15 | 1.14 | Inv. |
| 21 | 1.13 | 1.11 | 1.09 | 1.10 | Inv. |
| 22 | 1.02 | 1.03 | 1.01 | 1.02 | Inv. |
| 23 | 1.02 | 1.02 | 1.02 | 1.03 | Inv. |
| 24 | 1.11 | 1.09 | 1.09 | 1.14 | Inv. |

Comp.: Comparative example
Inv.: Inventive example

As is cleared by the results described in Table 3, the displaying media satisfying the constitution of the invention are superior in the stability under the high temperature and high humidity condition and in the anti-folding ability. Moreover, samples were prepared, in which liquid crystal layer Coating Liquids 5A, 6A and 7A were each coated as separated layers in place of liquid crystal layer Coating Liquid 8A, and the effects similar to those described in Table 3 could be confirmed. The similar effects could be obtained with respect to samples in which liquid crystal layer Coating Liquids 5B, 6B and 7B; 5C, 6C and 7C; 5D, 6D and 7D; 5E, 6E and 7E; 5F, 6F and 7F; 5G, 6G and 7G; and 5H, 6H and 7H were each coated as separated layers.

Example 4

<<Preparation Liquid Crystal Layer Coating Liquids>>

Dextrorotatory green light reflective liquid crystal layer Coating Liquids 9A through 9H were prepared in the same manner as in liquid crystal layer Coating Liquid 2A through 2H described in Example 2 except that liquid crystal Composition 2 was replaced by liquid crystal Composition 5 constituted by 77.0% by weight of nematic liquid crystal BL012 having positive dielectric constant anisotropy, manufactured by Merck Co., Ltd., and 23.0% by weight of dextrorotatory chiral agent CNL-611R, manufactured by Asahi Denka Kogyo Co., Ltd.

Furthermore, levorotatory green light reflective liquid crystal layer Coating Liquids 10A through 10H were prepared in the same manner as in liquid crystal layer Coating Liquid 3A through 3H described in Example 2 except that liquid crystal Composition 3 was replaced by liquid crystal Composition 6 constituted by 77.0% by weight of nematic liquid crystal BL012 having positive dielectric constant anisotropy, manufactured by Merck Co., Ltd., and 23.0% by weight of levorotatory chiral agent CNL-617L, manufactured by Asahi Denka Kogyo Co., Ltd.

Liquid crystal layer Coating Liquid 11A was prepared by mixing the above liquid crystal layer Coating Liquids 9A and 10A in a ratio of 1:1. Liquid crystal Coating Liquids. 11B through 11H were each prepared in the same manner as in the above by mixing liquid crystal layer Coating Liquids 9B and 10B, 9C and 10C, 9D and 10D, 9E and 10E, 9F and 10F, 9G and 10G, and 9H and 10H, respectively.

<<Preparation and Evaluation of Displaying Media>>

Displaying media were prepared in the same manner as in Displaying Media 1 through 8 except that liquid crystal layer Coating Liquids 1A through 1H were each replaced by liquid crystal coating layer Coating Liquids 11A through 11H, respectively, and subjected to the evaluation in the same manner as in Example 1. As a result of that, it was confirmed that the displaying media each satisfying the constitution of the invention were superior in the stability under the high temperature and high humidity condition and in the anti-folding ability similar to the results of Example 1.

Example 5

The liquid crystal Composition described in Tokkai Hei 5-273576, paragraph [0081] and [0082], was employed in place of liquid crystal Composition 1 in Example 1, and the phase transition voltage was measured. Evaluations the same as those in Example 1 were performed. According to the results of that, the variation in the phase transition voltage was small in the displaying media satisfying the constitution of the invention. Therefore, the effects of the invention were confirmed when the liquid crystal other than the cholesteric liquid crystal was employed.

Example 6

Samples each having the electrode patterns the same as those in Example 1 were prepared by an electrostatic ink-jet apparatus having a nozzle diameter at the jetting out point of 15 μm using liquid containing colloid silver particles with an average particle diameter of 20 nm instead of the screen printing by the silver past. The samples were evaluated in the same manner as in Example 1, and the effects of the invention similar to those in Example 1 could be confirmed.

Example 7

Samples having a hardened gelatin light shielding layer were prepared in the same manner as in Displaying Media 2 through 8 except that 10 mg per gram of gelatin of Exemplified Compound VS-10 was added to the layer formed by coating and drying the aqueous liquid containing 20% by weight of carbon black and 5% by weight of gelatin which was provided before the coating of the silver paste ink. It was found in thus prepared displaying media according to the invention that the voltage variation ratio was further lowered by 10% than that in the samples of Example 1.

The displaying medium having memorizing ability which is superior in the stability of displaying properties under the severe condition or to the folding stress can be provided by the invention.

It is to be noted that various changes and modifications will be apparent to those skilled in the art. Therefore, unless such changes and modifications depart from the scope of the present invention, they should be construed as being included therein.

What is claimed is:

1. A displaying medium comprising a substrate provided thereon a pair of electrodes and a plurality of constituting layers between the pair of electrodes, wherein each one of the constituting layers contains a binder and a liquid crystal composition dispersed in the binder, and the binder contains a hydrophilic polymer hardened by a hardening treatment, wherein the hardening treatment comprises crosslinking with a hardener represented by formula 1:

$$L\text{-}(SO_2\text{-}X)_m \qquad (1),$$

wherein L is an m-valent linking group, X is a —CH=CH$_2$ group or a —CH$_2$CH$_2$Y group, wherein Y is a group releasable in a form of HY by a base, and m is an integer of 2 to 10.

2. The displaying medium of claim 1, wherein the hydrophilic polymer is gelatin or a derivative thereof.

3. The displaying medium of claim 1, wherein the hydrophilic polymer is poly(vinyl alcohol) or a derivative thereof.

4. The displaying medium of claim 3, wherein the hardening treatment is photo-crosslinking treatment by light irradiation.

5. The displaying medium of claim 1, wherein the liquid crystal composition is a chiral nematic liquid crystal composition having a cholesteric phase.

6. The displaying medium of claim 5, wherein the chiral nematic liquid crystal composition contains plural liquid crystal compositions each selectively reflecting light selected from blue light, green light, red light and yellow light.

7. The displaying medium of claim 5, wherein the chiral nematic liquid crystal composition contains a liquid crystal shows dextrorotatory or levorotatory selective reflection.

8. The displaying medium of claim 1, wherein plural kinds of liquid crystal compositions are contained in the same constituting layer.

9. The displaying medium of claim 1, wherein the displaying medium further comprises additional constituting layers, each additional layer containing the dispersed liquid crystal composition.

10. The displaying medium of claim 1, wherein the dispersed liquid crystal was covered with a microcapsule wall.

11. The displaying medium of claim 1, wherein the displaying medium has a light shielding layer.

12. The displaying medium of claim 11, wherein the light shielding layer contains a hardened hydrophilic polymer as the binder.

* * * * *